(12) United States Patent
Mahaffey et al.

(10) Patent No.: US 8,454,711 B2
(45) Date of Patent: Jun. 4, 2013

(54) OPTICAL BRIGHTENERS AND COMPOSITIONS COMPRISING THE SAME

(75) Inventors: Robert L. Mahaffey, Spartanburg, SC (US); Eduardo Torres, Boiling Springs, SC (US); Dominick J. Valenti, Moore, SC (US); Patrick D. Moore, Pacolet, SC (US); Leland G. Close, Spartanburg, SC (US)

(73) Assignee: Milliken & Company, Spartanburg, SC (US)

( * ) Notice: Subject to any disclaimer, the term of this patent is extended or adjusted under 35 U.S.C. 154(b) by 0 days.

(21) Appl. No.: 13/602,918

(22) Filed: Sep. 4, 2012

(65) Prior Publication Data
US 2012/0329699 A1  Dec. 27, 2012

Related U.S. Application Data

(62) Division of application No. 13/110,483, filed on May 18, 2011, now Pat. No. 8,262,744.

(60) Provisional application No. 61/346,029, filed on May 18, 2010.

(51) Int. Cl.
*D06L 3/12* (2006.01)

(52) U.S. Cl.
USPC ............... 8/648; 8/652; 8/671; 8/688; 8/690; 8/691

(58) Field of Classification Search
USPC ................. 8/648, 652, 671, 688, 690, 691
See application file for complete search history.

(56) References Cited

U.S. PATENT DOCUMENTS

| | | |
|---|---|---|
| 3,663,538 A | 5/1972 | Lebkucher et al. |
| 3,970,647 A | 7/1976 | Balzer et al. |
| 4,992,204 A | 2/1991 | Kluger et al. |
| 5,039,782 A | 8/1991 | Langer et al. |
| 5,728,671 A | 3/1998 | Rohrbaugh et al. |
| 6,150,494 A | 11/2000 | Wang et al. |
| 7,060,201 B2 * | 6/2006 | Farrar ............. 252/301.23 |
| 2004/0238791 A1 | 12/2004 | Champ et al. |
| 2006/0106186 A1 | 5/2006 | Dupont et al. |

FOREIGN PATENT DOCUMENTS

| | | |
|---|---|---|
| WO | WO 01/46161 A1 | 6/2001 |
| WO | WO 03/078406 A1 | 9/2003 |
| WO | WO 03/104560 A1 | 12/2003 |
| WO | WO 2004/046293 A2 | 6/2004 |

OTHER PUBLICATIONS

STIC Search Report dated Jan. 16, 2013.*
Philbrook et al., Amy, Demonstration of Co-polymerication in Melamine-Urea-Formaldehyde Reactions Using $^{15}$N NMR Correlation Spectroscopy, Science Direct®, Polymer, pp. 2153-2156.
International Search Report, PCT/US2011/036983.

* cited by examiner

*Primary Examiner* — Eisa Elhilo
(74) *Attorney, Agent, or Firm* — Robert M. Lanning

(57) ABSTRACT

Novel compounds based on diaminostilbene are provided. The compounds conform to the general structures

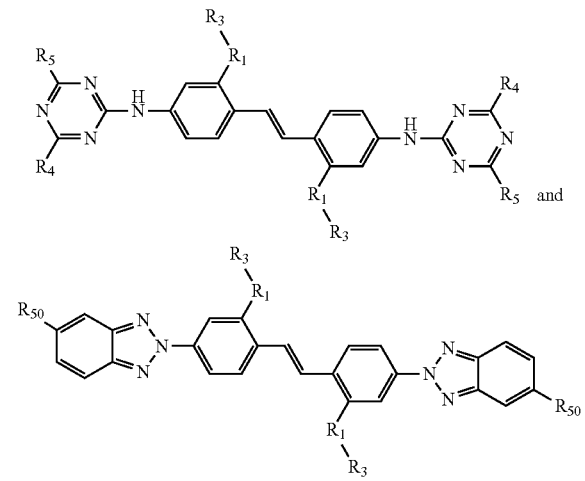

The compounds are useful as optical brighteners. Compositions, such as laundry compositions, containing such compounds are also provided.

22 Claims, No Drawings

OPTICAL BRIGHTENERS AND COMPOSITIONS COMPRISING THE SAME

CROSS-REFERENCE TO RELATED PATENT APPLICATIONS

This application is a DIV of the U.S. patent application Ser. No. 13/110,483, filed on May 18, 2011. Now a U.S. Pat. No. 8,262,744 B2, which claims, pursuant to 35 U.S.C. §119(e)(1), priority to and the benefit of the filing date of U.S. Patent Application No. 61/346,029 filed on May 18, 2010, which application is hereby incorporated by reference in its entirety.

TECHNICAL FIELD OF THE INVENTION

The present invention provides novel optical brighteners and compositions comprising the same.

BACKGROUND

Optical brighteners are a class of fluorescent materials that absorb light in the ultraviolet regions of the electromagnetic spectrum (e.g., less than 400 nm) and re-emit light in the violet and blue regions of the electromagnetic spectrum (e.g., greater than 400 nm). Optical brighteners are used in a variety of applications to enhance the color or appearance of materials, such as paper and fabrics. Generally, optical brighteners are used to increase the perceived whiteness of such materials by increasing the overall amount of blue light emanating from the material (i.e., reflected from the material and emitted by substances deposited on the material).

While optical brighteners have been used to treat a variety of materials, some commercially-available optical brighteners have proven difficult to effectively deposit on certain substrates. For example, some commercially-available optical brighteners do not effectively deposit onto polyester-based fabrics. When such optical brighteners are used in laundry care compositions, polyester-based fabrics treated with the compositions typically show no deposition of the optical brightener and, consequently, no improvement in their whiteness index.

Accordingly, a need still remains for optical brighteners that exhibit effective whitening on a variety of substrates and for compositions (e.g., laundry care compositions) comprising such optical brighteners. This application seeks to provide such optical brighteners.

BRIEF SUMMARY OF THE INVENTION

As noted above, the invention provides novel compounds which are suitable for use as optical brighteners. In particular, the invention provides novel compounds that are derivatives of 4,4'-diaminostilbene-2,2'-disulfonic acid or 4,4'-diaminostilbene-2,2'-dicarboxylic acid.

In a first embodiment, the invention provides compounds conforming to the structure of Formula (I)

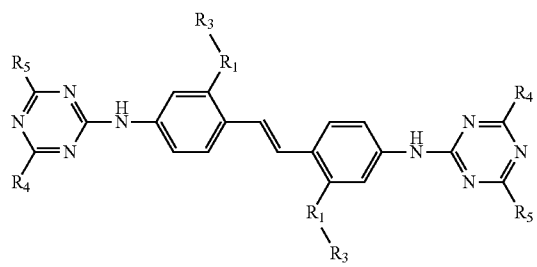

wherein $R_1$ is carbonyl or sulfonyl;
$R_3$ is selected from the group consisting of:
(A) hydroxyl;
(B) $-O^-M^+$, wherein $M^+$ is a positively charged counterion;
(C) a substituent conforming to the structure of Formula (II)

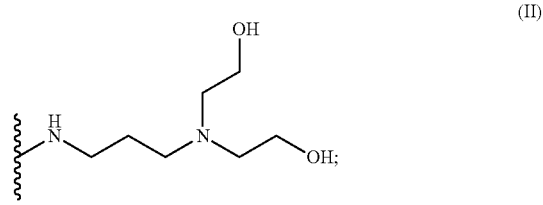 [SMILES: *NCCCN(CCO)CCO]

(D) a substituent conforming to the structure of Formula (III)

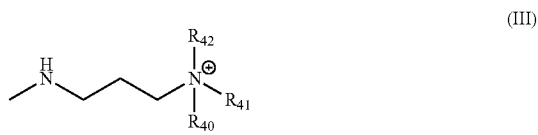

wherein $R_{40}$, $R_{41}$, and $R_{42}$ are independently selected from the group consisting of alkyl and hydroxyalkyl;
(E) a substituent conforming to the structure of Formula (IV)

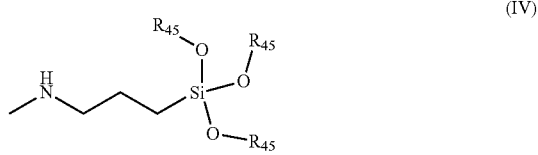

wherein $R_{45}$ is $C_1$-$C_{10}$ alkyl;
(F) a substituent conforming to the structure of Formula (VI)

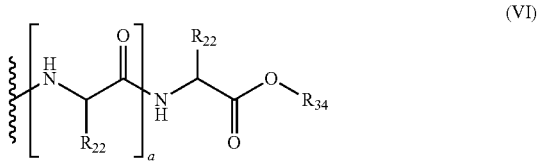

wherein $R_{22}$ is selected from the group consisting of hydrogen, alkyl, hydroxyalkyl, alkylamine, alkylamide, aryl, and hydroxyaryl; a is an integer from 0 to 100; and $R_{34}$ is hydrogen or alkyl;
(G) a substituent conforming to the structure of Formula (VII)

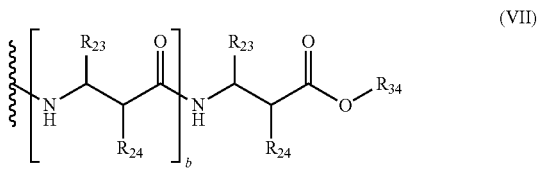

wherein $R_{23}$ and $R_{24}$ are independently selected from the group consisting of hydrogen, alkyl, hydroxyalkyl, alkylamine, alkylamide, aryl, and hydroxyaryl; b is an integer from 0 to 100; and $R_{34}$ is hydrogen or alkyl;

(H) a substituent conforming to the structure of Formula (X)

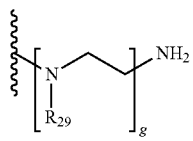

(X)

wherein $R_{29}$ is hydrogen or alkylamine, and g is an integer greater than or equal to 2;

(I) a substituent conforming to the structure of Formula (XII)

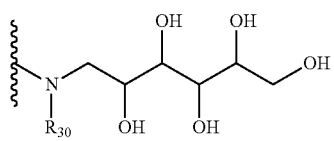

(XII)

wherein $R_{30}$ is hydrogen or alkyl; and (J) a substituent selected from the group consisting of —$OR_6$, —$NHR_6$, and —$NR_6R_6$; wherein $R_6$ is selected from the group consisting of —$R_7$—O—$R_8$—$R_9$ and —$R_8$—$R_9$; $R_7$ is alkyl or aryl; $R_9$ is hydrogen or alkyl; and $R_8$ is a divalent substituent selected from the group consisting of:

(i) divalent oligomeric substituents comprising two or more divalent repeating units independently selected from repeating units conforming to the structure of Formula (V)

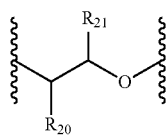

(V)

wherein $R_{20}$ and $R_{21}$ are independently selected from the group consisting of hydrogen, alkyl, hydroxyalkyl, aryl, alkoxyalkyl, and aryloxyalkyl;

(ii) divalent substituents conforming to the structure of Formula (VIII)

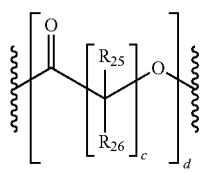

(VIII)

wherein $R_{25}$ and $R_{26}$ are independently selected from the group consisting of hydrogen, hydroxyl, and $C_1$-$C_{10}$ alkyl, c is an integer from 1 to 12, and d is an integer from 1 to 100;

(iii) divalent substituents conforming to the structure of Formula (IX)

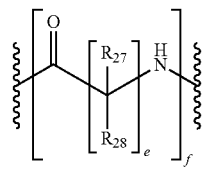

(IX)

wherein $R_{27}$ and $R_{28}$ are independently selected from the group consisting of hydrogen, hydroxyl, and $C_1$-$C_{10}$ alkyl, e is an integer from 1 to 12, and f is an integer from 1 to 100;

(iv) divalent substituents conforming to the structure of Formula (XI)

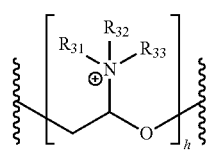

(XI)

wherein $R_{31}$, $R_{32}$, and $R_{33}$ are independently selected from alkyl and hydroxyalkyl, and h is an integer from 1 to 100; and (v) divalent substituents comprising two or more substituents selected from the group consisting of (i)-(iv);

$R_4$ and $R_5$ are independently selected from the group consisting of hydrogen, alkoxy, amino, alkylamino, arylamino, hydroxyalkylamino, morpholino, aniline, alkyl anilino, piperazinyl, piperidinyl, (K) a substituent conforming to the structure of Formula (II)

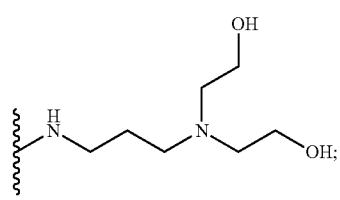

(II)

(L) a substituent conforming to the structure of Formula (III)

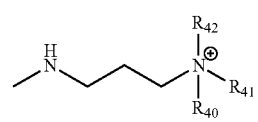

(III)

wherein $R_{40}$, $R_{41}$, and $R_{42}$ are independently selected from the group consisting of alkyl and hydroxyalkyl;

(M) a substituent conforming to the structure of Formula (IV)

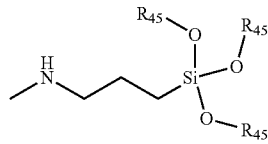

(IV)

wherein $R_{45}$ is $C_1$-$C_{10}$ alkyl;

(N) a substituent conforming to the structure of Formula (VI)

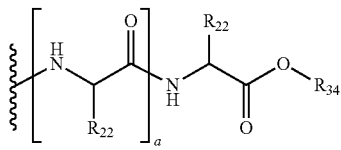

(VI)

wherein $R_{22}$ is selected from the group consisting of hydrogen, alkyl, hydroxyalkyl, alkylamine, alkylamide, aryl, and hydroxyaryl; a is an integer from 0 to 100; and $R_{34}$ is hydrogen or alkyl;

(O) a substituent conforming to the structure of Formula (VII)

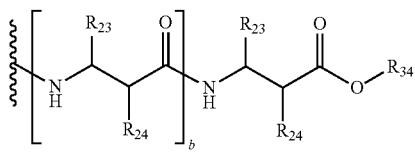

(VII)

wherein $R_{23}$ and $R_{24}$ are independently selected from the group consisting of hydrogen, alkyl, hydroxyalkyl, alkylamine, alkylamide, aryl, and hydroxyaryl; b is an integer from 0 to 100; and $R_{34}$ is hydrogen or alkyl;

(P) a substituent conforming to the structure of Formula (X)

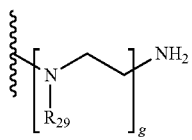

(X)

wherein $R_{29}$ is hydrogen or alkylamine, and g is an integer greater than or equal to 2;

(Q) a substituent conforming to the structure of Formula (XII)

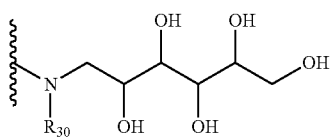

(XII)

wherein $R_{30}$ is hydrogen or alkyl; and (R) a substituent selected from the group consisting of —$OR_{10}$, —$NHR_{10}$, and —$NR_{10}R_{10}$; wherein $R_{10}$ is selected from the group consisting of —$R_{11}$—O—$R_{12}$—$R_{13}$ and —$R_{12}$—$R_{13}$; $R_{11}$ is alkyl or aryl; $R_{13}$ is hydrogen or alkyl; and $R_{12}$ is a divalent substituent selected from the group consisting of:

(i) divalent oligomeric substituents comprising two or more divalent repeating units independently selected from repeating units conforming to the structure of Formula (V)

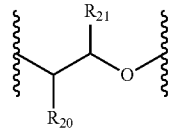

(V)

wherein $R_{20}$ and $R_{21}$ are independently selected from the group consisting of hydrogen, alkyl, hydroxyalkyl, aryl, alkoxyalkyl, and aryloxyalkyl;

(ii) divalent substituents conforming to the structure of Formula (VIII)

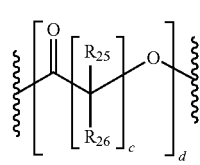

(VIII)

wherein $R_{25}$ and $R_{26}$ are independently selected from the group consisting of hydrogen, hydroxyl, and $C_1$-$C_{10}$ alkyl, c is an integer from 1 to 12, and d is an integer from 1 to 100;

(iii) divalent substituents conforming to the structure of Formula (IX)

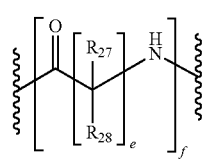

(IX)

wherein $R_{27}$ and $R_{28}$ are independently selected from the group consisting of hydrogen, hydroxyl, and $C_1$-$C_{10}$ alkyl, e is an integer from 1 to 12, and f is an integer from 1 to 100;

(iv) divalent substituents conforming to the structure of Formula (XI)

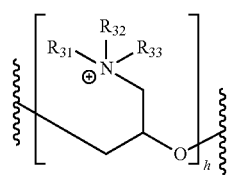

(XI)

wherein $R_{31}$, $R_{32}$, and $R_{33}$ are independently selected from alkyl and hydroxyalkyl, and h is an integer from 1 to 100; and (v) divalent substituents comprising two or more substituents selected from the group consisting of (i)-(iv).

In such embodiments of the compounds of the invention, $R_3$ is not hydroxyl or —O⁻M⁺ (i.e., at least one $R_3$ is not hydroxyl or —O⁻M⁺) when $R_4$ and $R_5$ are both selected from the group consisting of hydrogen, alkoxy, amino, alkylamino, arylamino, hydroxyalkylamino, morpholino, anilino, and alkyl anilino.

In another embodiment, the invention provides compounds conforming to the structure of Formula (XX)

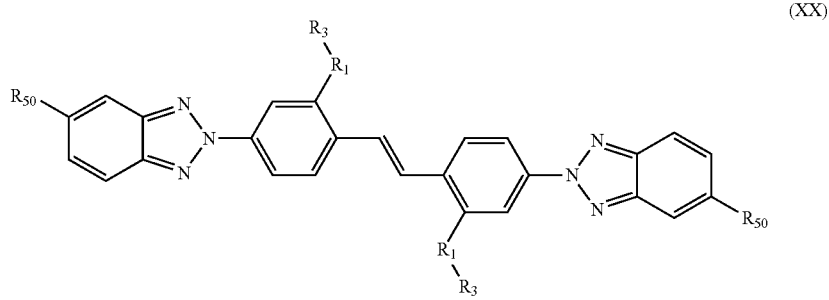

(XX)

wherein $R_1$ is carbonyl or sulfonyl;

$R_3$ is selected from the group consisting of:

(A) hydroxyl;

(B) —O⁻M⁺, wherein M⁺ is a positively charged counterion;

(C) a substituent conforming to the structure of Formula (II)

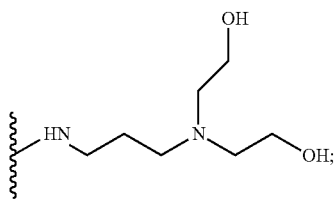

(II)

(D) a substituent conforming to the structure of Formula (III)

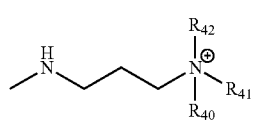

(III)

wherein $R_{40}$, $R_{41}$, and $R_{42}$ are independently selected from the group consisting of alkyl and hydroxyalkyl;

(E) a substituent conforming to the structure of Formula (IV)

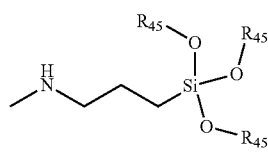

(IV)

wherein $R_{45}$ is $C_1$-$C_{10}$ alkyl;

(F) a substituent conforming to the structure of Formula (VI)

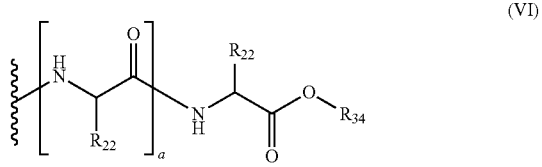

(VI)

wherein $R_{22}$ is selected from the group consisting of hydrogen, alkyl, hydroxyalkyl, alkylamine, alkylamide, aryl, and hydroxyaryl; a is an integer from 0 to 100; and $R_{34}$ is hydrogen or alkyl;

(G) a substituent conforming to the structure of Formula (VII)

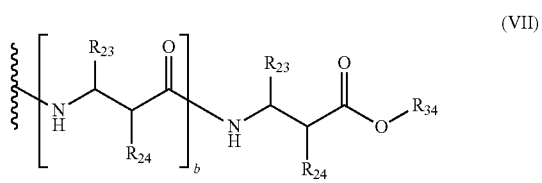

(VII)

wherein $R_{23}$ and $R_{24}$ are independently selected from the group consisting of hydrogen, alkyl, hydroxyalkyl, alkylamine, alkylamide, aryl, and hydroxyaryl; b is an integer from 0 to 100; and $R_{34}$ is hydrogen or alkyl;

(H) a substituent conforming to the structure of Formula (X)

(X)

wherein $R_{29}$ is hydrogen or alkylamine, and g is an integer greater than or equal to 2;

(I) a substituent conforming to the structure of Formula (XII)

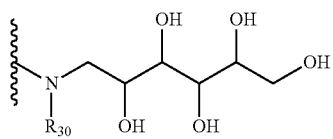

(XII)

wherein $R_{30}$ is hydrogen or alkyl; and (J) a substituent selected from the group consisting of $-OR_6$, $-NHR_6$, and $-NR_6R_6$; wherein $R_6$ is selected from the group consisting of $-R_7-O-R_8-R_9$ and $-R_8-R_9$; $R_7$ is alkyl or aryl; $R_9$ is hydrogen or alkyl; and $R_8$ is a divalent substituent selected from the group consisting of:
(i) divalent oligomeric substituents comprising two or more divalent repeating units independently selected from repeating units conforming to the structure of Formula (V)

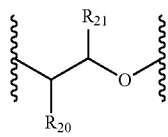

(V)

wherein $R_{20}$ and $R_{21}$ are independently selected from the group consisting of hydrogen, alkyl, hydroxyalkyl, aryl, alkoxyalkyl, and aryloxyalkyl;
(ii) divalent substituents conforming to the structure of Formula (VIII)

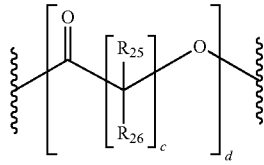

(VIII)

wherein $R_{25}$ and $R_{26}$ are independently selected from the group consisting of hydrogen, hydroxyl, and $C_1$-$C_{10}$ alkyl, c is an integer from 1 to 12, and d is an integer from 1 to 100;
(iii) divalent substituents conforming to the structure of Formula (IX)

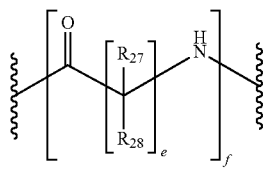

(IX)

wherein $R_{27}$ and $R_{28}$ are independently selected from the group consisting of hydrogen, hydroxyl, and $C_1$-$C_{10}$ alkyl, e is an integer from 1 to 12, and f is an integer from 1 to 100;

(iv) divalent substituents conforming to the structure of Formula (XI)

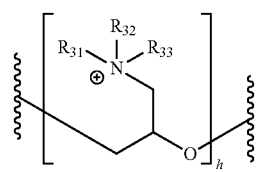

(XI)

wherein $R_{31}$, $R_{32}$, and $R_{33}$ are independently selected from alkyl and hydroxyalkyl, and h is an integer from 1 to 100; and
(v) divalent substituents comprising two or more substituents selected from the group consisting of (i)-(iv);

$R_{50}$ is $-R_{51}-R_{52}$ or $-OR_{10}$, provided $R_{51}$ is independently selected from the substituents recited above for $R_1$, and $R_{52}$ is independently selected from the substituents recited above for $R_3$;

$R_{10}$ is selected from the group consisting of $-R_{11}-O-R_{12}-R_{13}$ and $-R_{12}-R_{13}$; $R_{11}$ is alkyl or aryl; $R_{13}$ is hydrogen or alkyl; and $R_{12}$ is a divalent substituent selected from the group consisting of:
(i) divalent oligomeric substituents comprising two or more divalent repeating units independently selected from repeating units conforming to the structure of Formula (V)

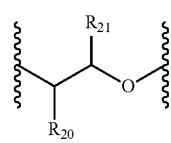

(V)

wherein $R_{20}$ and $R_{21}$ are independently selected from the group consisting of hydrogen, alkyl, hydroxyalkyl, aryl, alkoxyalkyl, and aryloxyalkyl;
(ii) divalent substituents conforming to the structure of Formula (VIII)

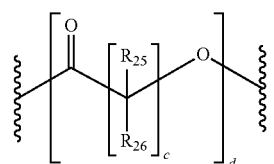

(VIII)

wherein $R_{25}$ and $R_{26}$ are independently selected from the group consisting of hydrogen, hydroxyl, and $C_1$-$C_{10}$ alkyl, c is an integer from 1 to 12, and d is an integer from 1 to 100;

(iii) divalent substituents conforming to the structure of Formula (IX)

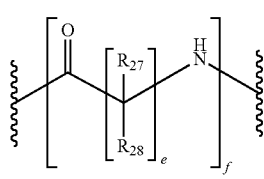

wherein $R_{27}$ and $R_{28}$ are independently selected from the group consisting of hydrogen, hydroxyl, and $C_1$-$C_{10}$ alkyl, e is an integer from 1 to 12, and f is an integer from 1 to 100;

(iv) divalent substituents conforming to the structure of Formula (XI)

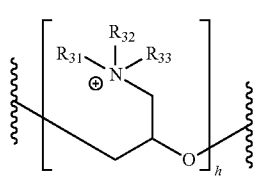

wherein $R_{31}$, $R_{32}$, and $R_{33}$ are independently selected from alkyl and hydroxyalkyl, and h is an integer from 1 to 100; and (v) divalent substituents comprising two or more substituents selected from the group consisting of (i)-(iv).

In such embodiments, at least one $R_3$ is not hydroxyl or —O⁻M⁺ when both $R_{52}$ are either hydroxyl or —O⁻M⁺, and at least one $R_{52}$ is not hydroxyl or —O⁻M⁺ when both $R_3$ are either hydroxyl or —O⁻M⁺.

The invention also provides laundry compositions, such as laundry detergents and fabric care compositions, comprising one or more of the above-described compounds.

DETAILED DESCRIPTION OF THE INVENTION

As described below, certain embodiments of the compounds of the invention comprise groups containing a series of repeating units. As will be understood by those of skill in the art, employing the currently-known methods for producing compounds containing a series of repeating units typically produces a polydisperse collection of molecules possessing varying numbers of the repeating units. Accordingly, as will be understood by those of ordinary skill in the art, the values reported for the number of repeating units are, when used to refer to a collection of molecules conforming to the structure or a composition containing such a collection of molecules, intended to refer to the median value exhibited by the collection of molecules.

As noted above, the invention provides, in a first embodiment, compounds conforming to the structure of Formula (I)

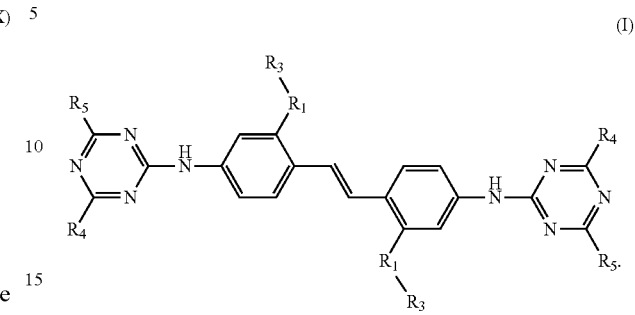

In Formula (I), $R_1$ is either carbonyl or sulfonyl, with sulfonyl being preferred.

In the structure of Formula (I), each $R_3$ can be the same or different. For example, one $R_3$ can be selected from hydroxyl or —O⁻M⁺, while the other $R_3$ is selected from the other group of substituents described below as suitable for $R_3$ of Formula (I). In certain embodiments, $R_3$ can be either hydroxyl or —O⁻M⁺, where M⁺ is a positively charged counterion. M⁺ can be any suitable positively charged counterion, such as the alkali metal cations and alkaline earth metal cations.

In certain embodiments, $R_3$ can be a substituent conforming to the structure of Formula (II)

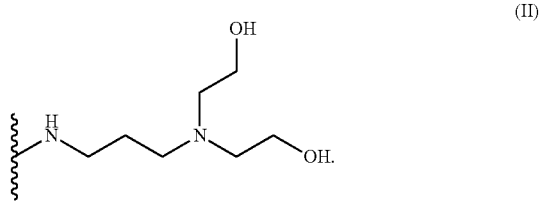 [SMILES: *NCCCN(CCO)CCO]

In another embodiment, $R_3$ can be a substituent conforming to the structure of Formula (III)

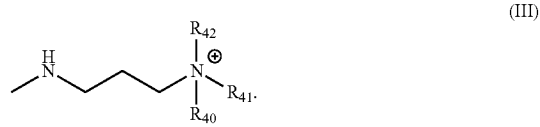

In the structure of Formula (III), $R_{40}$, $R_{41}$, and $R_{42}$ are each independently selected from the group consisting of alkyl and hydroxyalkyl (i.e., alkyl having a terminal hydroxyl group). The alkyl and hydroxyalkyl groups can be of any suitable length and can include linear and branched alkyl groups. Suitable alkyl and hydroxyalkyl groups generally include $C_1$-$C_{25}$ alkyl, preferably $C_1$-$C_{18}$ alkyl, more preferably $C_1$-$C_{10}$ alkyl. In a possibly preferred embodiment, $R_{40}$, $R_{41}$, and $R_{42}$ are hydroxyethyl.

In another embodiment, $R_3$ can be a substituent conforming to the structure of Formula (IV)

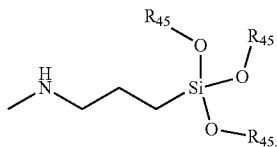

(IV)

In the structure of Formula (IV), $R_{45}$ is alkyl. The alkyl group can be of any suitable length and includes linear and branched alkyl groups. Suitable alkyl groups generally include $C_1$-$C_{25}$ alkyl, preferably $C_1$-$C_{18}$ alkyl, and more preferably $C_1$-$C_{10}$ alkyl. In a possibly preferred embodiment, $R_{45}$ are n-propyl.

In another embodiment, $R_3$ can be a substituent conforming to the structure of Formula (VI)

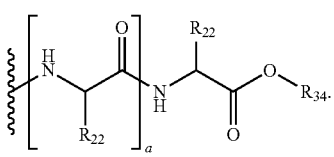

(VI)

In the structure of Formula (VI), $R_{22}$ is selected from the group consisting of hydrogen, alkyl, hydroxyalkyl, alkylamine, alkylamide, aryl, and hydroxyaryl. The alkyl, hydroxyalkyl, alkylamine, and alkylamide groups can be of any suitable length and can include linear and branched alkyl groups. Suitable alkyl groups include, but are not necessarily limited to, methyl, propyl (e.g., isopropyl), and butyl (e.g., sec-butyl or tert-butyl). Suitable hydroxyalkyl groups include, but are not necessarily limited to, hydroxymethyl and 1-hydroxyethyl. Suitable aryl groups include, but are not necessarily limited to, benzyl and 4-hydroxybenzyl. As discussed in detail below, the structure of Formula (VI) can be produced using an alpha amino acid, such as the naturally-occurring amino acids arginine, histidine, lysine, aspartic acid, glutamic acid, serine, threonine, asparagines, glutamine, cysteine, selenocysteine, glycine, proline, alanine, isoleucine, leucine, methionine, phenylalanine, tryptophan, tyrosine, and valine. The variable a can be any integer from 0 to 100 (e.g., from 1 to 50, from 1 to 30, or from 1 to 25). Each $R_{22}$ in the substituent can be the same or different. In other words, the substituent can be prepared from a single alpha amino acid, or the substituents can be prepared from a mixture of two or more alpha amino acids. In the structure of Formula (VI), $R_{34}$ can be hydrogen or alkyl. The alkyl group can be of any suitable length and can include linear and branched alkyl groups. Suitable alkyl groups generally include $C_1$-$C_{25}$ alkyl, preferably $C_1$-$C_{18}$ alkyl, and more preferably $C_1$-$C_{10}$ alkyl.

In another embodiment, $R_3$ can be a substituent conforming to the structure of Formula (VII)

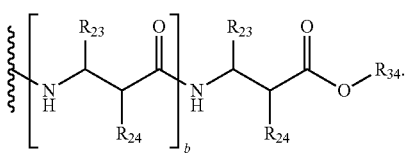

(VII)

In the structure of Formula (VII), $R_{23}$ and $R_{24}$ are independently selected from the group consisting of hydrogen, alkyl, hydroxyalkyl, alkylamine, alkylamide, aryl, and hydroxyaryl. The alkyl, hydroxyalkyl, alkylamine, and alkylamide groups can be of any suitable length and can include linear and branched alkyl groups. Suitable alkyl groups include, but are not necessarily limited to, methyl, propyl (e.g., isopropyl), and butyl (e.g., sec-butyl or tert-butyl). Suitable hydroxyalkyl groups include, but are not necessarily limited to, hydroxymethyl and 1-hydroxyethyl. Suitable aryl groups include, but are not necessarily limited to, benzyl and 4-hydroxybenzyl. As discussed in detail below, the structure of Formula (VII) can be produced using a beta amino acid. The variable b can be any integer from 0 to 100 (e.g., from 1 to 50, from 1 to 30, or from 1 to 25). Each $R_{23}$ and $R_{24}$ in the substituent can be the same or different. In other words, the substituent can be prepared from a single beta amino acid, or the substituent can be prepared from a mixture of two or more beta amino acids. In the structure of Formula (VII), $R_{34}$ can be hydrogen or alkyl. The alkyl group can be of any suitable length and can include linear and branched alkyl groups. Suitable alkyl groups generally include $C_1$-$C_{25}$ alkyl, preferably $C_1$-$C_{18}$ alkyl, and more preferably $C_1$-$C_{10}$ alkyl.

In another embodiment, $R_3$ can be a substituent conforming to the structure of Formula (X)

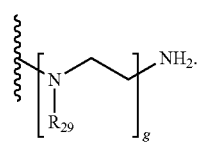

(X)

The structure of Formula (X) represents both linear and branched polyethylenimines. Thus, $R_{29}$ can be hydrogen or alkylamine, and g is an integer greater than or equal to 2 (e.g., 2 to 100, 2 to 50, 2 to 30, or 2 to 25). Suitable alkylamines include ethylamine and larger alkylamines having linear or branched structures containing multiple amine groups. Accordingly, in the structure of Formula (X), each $R_{29}$ in the substituent can be the same or different.

In another embodiment, $R_3$ can be a substituent conforming to the structure of Formula (XII)

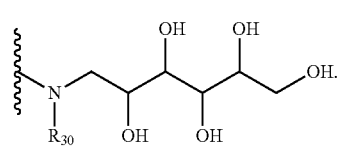

(XII)

In the structure of Formula (XII), $R_{30}$ can be hydrogen or alkyl. The alkyl group can be of any suitable length and includes linear and branched alkyl groups. Suitable alkyl groups generally include $C_1$-$C_{25}$ alkyl, preferably $C_1$-$C_{18}$ alkyl, and more preferably $C_1$-$C_{10}$ alkyl. In those embodiments in which $R_3$ is a substituent conforming to the structure of Formula (XII), the resulting compound can be further reacted so as to substitute one or more of the hydroxyl groups on the structure with another substituent, such as any of those described below for $R_6$ and $R_8$.

In other embodiments, $R_3$ can be a substituent selected from the group consisting of substituents having the structures —$OR_6$, —$NHR_6$, and —$NR_6R_6$ (which represents a tertiary amine group having two $R_6$ groups attached to the amine nitrogen). The $R_6$ group is selected from the group consisting of —$R_7$—O—$R_8$—$R_9$ and —$R_8$—$R_9$. $R_7$ can be alkyl or aryl. The alkyl group for $R_7$ can be of any suitable length and includes linear and branched alkyl groups. Suitable alkyl groups for $R_7$ generally include $C_1$-$C_{25}$ alkyl, preferably $C_1$-$C_{18}$ alkyl, and more preferably $C_1$-$C_{10}$ alkyl. The aryl group for $R_7$ can be any suitable aryl group, including both substituted aryl and unsubstituted aryl groups. In one possibly preferred embodiment, $R_7$ can be a phenyl group substituted with a sulfonamide group in the para position (i.e., the para position relative to the attachment to the nitrogen atom of $R_3$) with $R_8$ being bonded to the sulfonamide group. For the groups —$R_7$—O—$R_8$—$R_9$ and —$R_8$—$R_9$, $R_9$ can be hydrogen or alkyl. The alkyl group can be of any suitable length and can include linear and branched alkyl groups. Suitable alkyl groups generally include $C_1$-$C_{25}$ alkyl, preferably $C_1$-$C_{18}$ alkyl, and more preferably $C_1$-$C_{10}$ alkyl. For the groups —$R_7$—O—$R_8$—$R_9$ and —$R_8$—$R_9$, $R_9$ preferably is hydrogen.

For the groups —$R_7$—O—$R_8$—$R_9$ and —$R_8$—$R_9$, $R_8$ can be a divalent substituent selected from a specified group. In one embodiment, $R_8$ can be a divalent oligomeric substituent comprising two or more divalent repeating units independently selected from repeating units conforming to the structure of Formula (V)

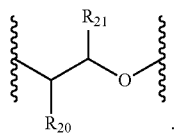

(V)

In the structure of Formula (V), $R_{20}$ and $R_{21}$ are independently selected from the group consisting of hydrogen, alkyl, hydroxyalkyl, aryl, alkoxyalkyl, and aryloxyalkyl. The alkyl group for $R_{20}$ and $R_{21}$ can be of any suitable length and include linear and branched alkyl groups. Suitable alkyl groups generally include $C_1$-$C_{25}$ alkyl, preferably $C_1$-$C_{18}$ alkyl, and more preferably $C_1$-$C_{10}$ alkyl (e.g., methyl and n-propyl). The hydroxyalkyl groups for $R_{20}$ and $R_{21}$ can be any suitable hydroxyalkyl group having an alkyl substituent of any suitable length and having either a linear or branched structure. Suitable hydroxyalkyl groups for $R_{20}$ and $R_{21}$ include, but are not limited to, hydroxymethyl. The aryl groups for $R_{20}$ and $R_{21}$ can be any suitable aryl group, with the phenyl group being potentially preferred. The divalent oligomeric substituent comprising repeating units conforming to the structure of Formula (V) can comprise any suitable number of repeating units. For example, the oligomeric substituent can comprise from 2 to 100 repeating units (e.g., 2 to 50, 2 to 30, or 2 to 25). In such divalent oligomeric substituents, the repeating units can be all the same (i.e., $R_{20}$ and $R_{21}$ can be the same for all of the repeating units in the substituent), or the substituent can be composed of two or more different repeating units conforming to the structure of Formula (V). In a divalent oligomeric substituent comprising two or more different repeating units conforming to the structure of Formula (V), the different repeating units can be disposed in either a block arrangement (i.e., an arrangement in which a plurality of the same repeating units are disposed adjacent to each other in the substituent) or a random arrangement (i.e., an arrangement in which the repeating units are randomly arranged within the substituent).

In certain possibly preferred embodiments, $R_8$ can be a divalent oligomeric substituent comprising repeating units selected from the group consisting of ethylene oxide, propylene oxide, butylene oxide, and combinations thereof. In such embodiment, the substituent can be composed solely of one of these repeating units, or the substituent can be composed of any suitable combination of these repeating units. As noted above, in a divalent substituent comprising a combination of two or more different repeating units, the repeating units can be disposed in either a block arrangement or a random arrangement. In certain possibly preferred embodiments, $R_8$ can be a divalent substituent conforming to the structure of one of Formulae (XIII)-(XV)

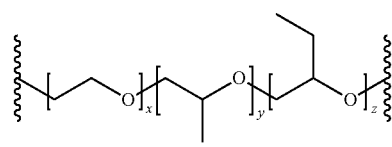

(XIII)

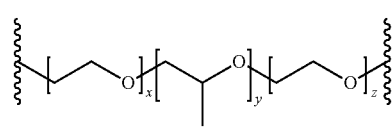

(XIV)

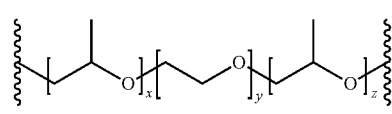

(XV)

In each of the structures of Formulae (XIII)-(XV), x, y, and z are integers from 0 to 100, and the sum of x, y, and z is 2 or greater (e.g., 2 to 100, 2 to 50, 2 to 30, or 2 to 25).

In certain possibly preferred embodiments, $R_8$ can be a divalent oligomeric substituent comprising one or more repeating units derived from glycidol or a glycidyl ether. Suitable glycidyl ethers include, but are not necessarily limited to, methyl glycidyl ether, isobutyl glycidyl ether, isopropyl glycidyl ether, tert-butyl glycidyl ether, 2-ethylhexyl glycidyl ether, hexadecyl glycidyl ether.

In another embodiment, $R_8$ can be a divalent substituent conforming to the structure of Formula (VIII)

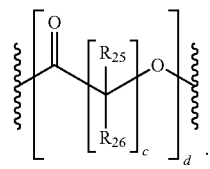

(VIII)

In the structure of Formula (VIII), $R_{25}$ and $R_{26}$ are independently selected from the group consisting of hydrogen, hydroxyl, and alkyl (e.g., $C_1$-$C_{10}$ alkyl), c is an integer from 1 to 12, and d is an integer from 1 to 100 (e.g., 2 to 100, 1 to 50, 2 to 50, 1 to 30, 2 to 30, 1 to 25, or 2 to 25). In certain possibly preferred embodiments, $R_{25}$ and $R_{26}$ are both hydrogen, and c is 5.

In another embodiment, $R_8$ can be a divalent substituent conforming to the structure of Formula (IX)

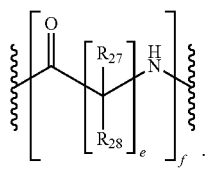

In the structure of Formula (IX), $R_{27}$ and $R_{28}$ are independently selected from the group consisting of hydrogen, hydroxyl, and alkyl (e.g., $C_1$-$C_{10}$ alkyl), e is an integer from 1 to 12, and f is an integer from 1 to 100 (e.g., 2 to 100, 1 to 50, 2 to 50, 1 to 30, 2 to 30, 1 to 25, or 2 to 25). In certain possibly preferred embodiments, $R_{25}$ and $R_{26}$ are both hydrogen, and e is 5.

In another embodiment, $R_8$ can be a divalent substituent conforming to the structure of Formula (XI)

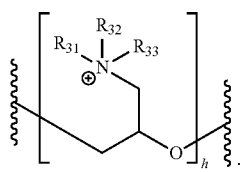

In the structure of Formula (XI), $R_{31}$, $R_{32}$, and $R_{33}$ are independently selected from alkyl and hydroxyalkyl. The alkyl and hydroxyalkyl groups suitable for $R_{31}$, $R_{32}$, and $R_{33}$ can be of any suitable length and can include linear and branched alkyl groups. Suitable alkyl and hydroxyalkyl groups generally include $C_1$-$C_{25}$ alkyl, preferably $C_1$-$C_{18}$ alkyl, more preferably $C_1$-$C_{10}$ alkyl. In a possibly preferred embodiment, $R_{31}$, $R_{32}$, and $R_{33}$ are each methyl. In the structure of Formula (XI), h is an integer from 1 to 100 (e.g., 2 to 100, 1 to 50, 2 to 50, 1 to 30, 2 to 30, 1 to 25, or 2 to 25). In the structure of Formula (XI), the positive charge on the ammonium group can be balanced by any suitable negatively-charged counterion, such as a halide ion (e.g., chloride ion).

In certain other embodiments, $R_8$ can be a divalent substituent comprising two or more of the divalent substituents described above as being suitable for $R_8$. In such embodiments, the combination of two or more substituents can be arranged in either a block arrangement or a random arrangement. For example, in one possibly preferred embodiment, $R_8$ can be a divalent constituent comprising two or more repeating units conforming to the structure of Formula (V) and another divalent constituent conforming to the structure of Formula (VIII). In another embodiment, $R_8$ can be a divalent constituent comprising two or more repeating units conforming to the structure of Formula (V) which is capped with a divalent constituent conforming to the structure of Formula (XI).

In certain embodiments, $R_4$ and $R_5$ can be independently selected from the group consisting of hydrogen, alkoxy, amino, alkylamino, arylamino, hydroxyalkylamino, morpholino, aniline, alkyl anilino, piperazinyl, and piperidinyl.

In certain other embodiments, $R_4$ and $R_5$ can be independently selected from the group consisting of substituents conforming to the structures of Formula (II), Formula (III), Formula (IV), Formula (VI), Formula (VII), Formula (X), and Formula (XII), as the same have been described above.

In certain other embodiments, $R_4$ and $R_5$ can be independently selected from the group consisting of —$OR_{10}$, —$NHR_{10}$, and —$NR_{10}R_{10}$ (which represents a tertiary amine group having two $R_{10}$ groups attached to the amine nitrogen). The $R_{10}$ group is selected from the group consisting of —$R_{11}$—O—$R_{12}$—$R_{13}$ and —$R_{12}$—$R_{13}$. $R_{11}$ can be alkyl or aryl. The alkyl group for $R_{11}$ can be of any suitable length and includes linear and branched alkyl groups. Suitable alkyl groups for $R_{11}$ generally include $C_1$-$C_{25}$ alkyl, preferably $C_1$-$C_{15}$ alkyl, and more preferably $C_1$-$C_{10}$ alkyl. The aryl group for $R_{11}$ can be any suitable aryl group, including both substituted aryl and unsubstituted aryl groups. In one possibly preferred embodiment, $R_{11}$ can be a phenyl group substituted with a sulfonamide group in the para position (i.e., the para position relative to the attachment to the nitrogen atom of $R_4$ or $R_5$) with $R_{12}$ being bonded to the sulfonamide group. For the groups —$R_{11}$—O—$R_{12}$—$R_{13}$ and —$R_{12}$—$R_{13}$, $R_{13}$ can be hydrogen or alkyl. The alkyl group can be of any suitable length and can include linear and branched alkyl groups. Suitable alkyl groups generally include $C_1$-$C_{25}$ alkyl, preferably $C_1$-$C_{15}$ alkyl, and more preferably $C_1$-$C_{10}$ alkyl. For the groups —$R_{11}$—O—$R_{12}$—$R_{13}$ and —$R_{12}$—$R_{13}$, $R_{13}$ preferably is hydrogen.

For the groups —$R_{11}$—O—$R_{12}$—$R_{13}$ and —$R_{12}$—$R_{13}$, $R_{12}$ is a divalent substituent and can be selected from the group consisting of substituents conforming to the structures of Formula (V), Formula (VIII), Formula (IX), Formula (XI), and combinations thereof, as the same have been described above.

In another series of embodiments, the invention provides diaminostilbene-based optical brighteners having two benzotriazole groups attached thereto. In such embodiments, the compounds conform to the structure of Formula (XX)

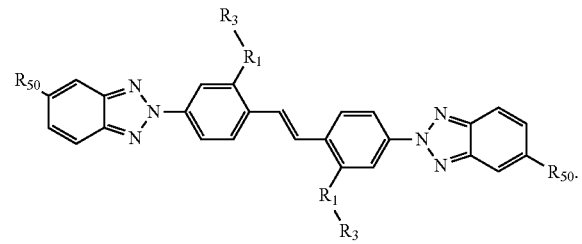

In such embodiments, $R_1$ and $R_3$ of Formula (XX) can be any of the substituents described above as suitable $R_1$ and $R_3$ groups for the compounds conforming to the structure of Formula (I) and, as in the case of Formula (I), the two $R_3$ in Formula (XX) can be the same or different. $R_{50}$ is —$R_{51}$—$R_{52}$ or —$OR_B$). $R_{51}$ is independently selected from the substituents recited above for $R_1$, and $R_{52}$ is independently selected from the substituents recited above for $R_3$. In other words, $R_{51}$ and $R_{52}$, while being selected from the same group as $R_1$ and $R_3$, respectively, are not necessarily the same substituents as $R_1$ and $R_3$ of Formula (XX). $R_{10}$ of Formula (XX) can be any of the substituents described above as suitable $R_{10}$ groups for the compounds conforming to the structure of Formula (I).

The compound according to the invention can be synthesized using any suitable process. For example, those compounds in which a substituent other than hydroxyl or —O⁻M⁺ is at $R_3$ of Formula (I) can be prepared by first reacting the corresponding sulfonic acid-substituted diaminostilbene derivative or carboxylic acid-substituted diaminostilbene to produce the corresponding sulfonyl chloride or acid chloride. This reaction can be carried out using techniques known in the art and any suitable reagent, such as thionyl chloride, phosphorous trichloride, phosphorous pentachloride, or oxalyl chloride. Once the corresponding sulfonyl chloride or acid chloride derivative of the diaminostilbene has been produced, the derivative can then be reacted with the appropriate amine or alcohol to attach the desired substituent to the sulfonyl or carbonyl group on the diaminostilbene. The amount of amine or alcohol added can be limited so as to yield a compound in which only one of the sulfonyl chloride or acid chloride groups has reacted to attach the substituent to the sulfonyl or carbonyl group on the diaminostilbene. A reaction scheme generally depicting the reaction described above beginning with a known diaminostilbene compound is set forth below:

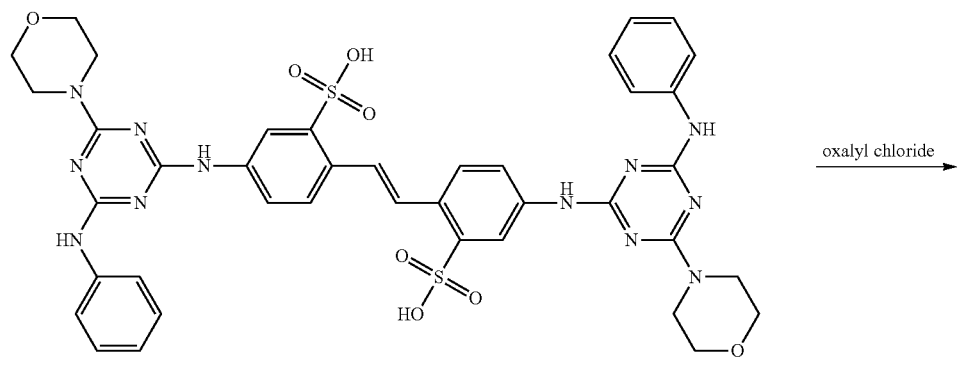

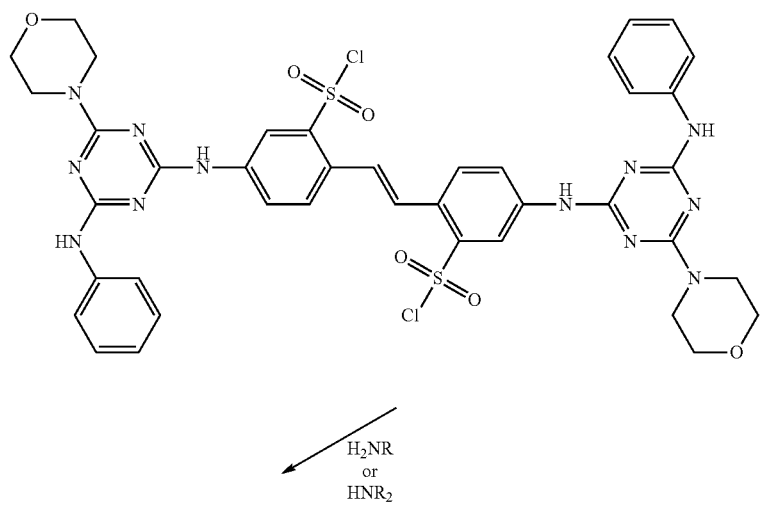

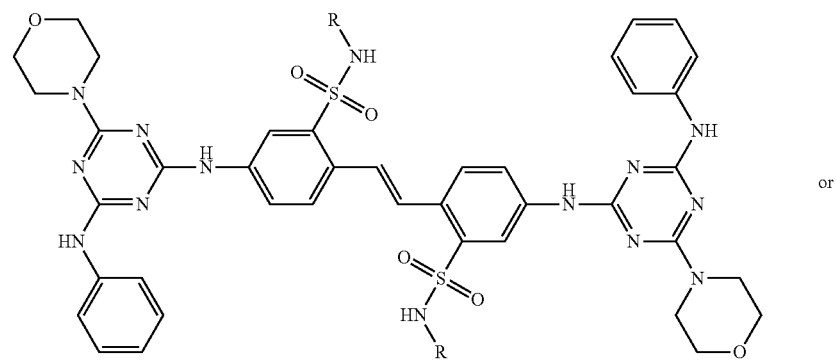

or

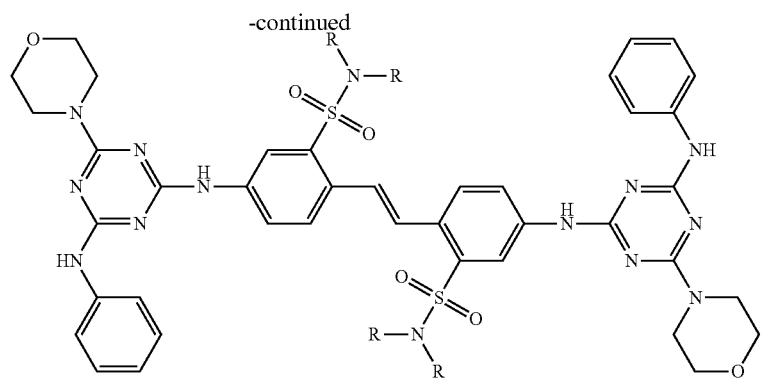

In certain embodiments, the amine or alcohol compound used in the reaction described above can be a polyfunctional amine (e.g., an amine having two or more amine groups) or a polyfunctional alcohol (e.g., an alcohol having two or more hydroxyl groups). When such polyfunctional compounds are used, it is believed that the compound can react in the manner described above with the sulfonyl chloride or acid chloride groups present on two or more of the diaminostilbene compounds, thereby producing a compound in which two or more of the distyryl-biphenyl moieties are linked by a substituent formed from this polyfunctional amine or alcohol compound. The polyfunctional amine and alcohol compounds suitable for use in such a reaction can be any polyfunctional amine or alcohol compound that will react with the diaminostilbene compound in the manner described above. Indeed, several of the suitable substituents described above contain two or more groups that can react with the sulfonyl chloride or acid chloride and, therefore, such substituents are believed to be suitable for producing a compound containing two or more diaminostilbene moieties.

In another process, the compounds conforming to Formula (I) can be synthesized by reacting one equivalent of 4,4'-diaminostilbene-2,2'-disulfonic acid (or 4,4'-diaminostilbene-2,2'-dicarboxylic acid) with two equivalents of cyanuric chloride to produce the diaminostilbenedisulfonic acid-bis-dichlorotriazine adduct. The resulting adduct can then be reacted with the appropriate amine or alcohol to yield the desired compound. Furthermore, by controlling the pH and temperature of the reactant mixture during the reaction of amine or alcohol, the reaction can be controlled in such a way to permit the addition of two different amines or alcohols to each triazine ring. In other words, the reaction can be controlled so that $R_4$ and $R_5$ are different. A reaction scheme generally depicting such a reaction is set forth below:

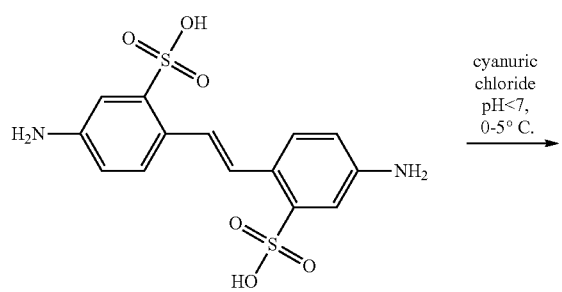

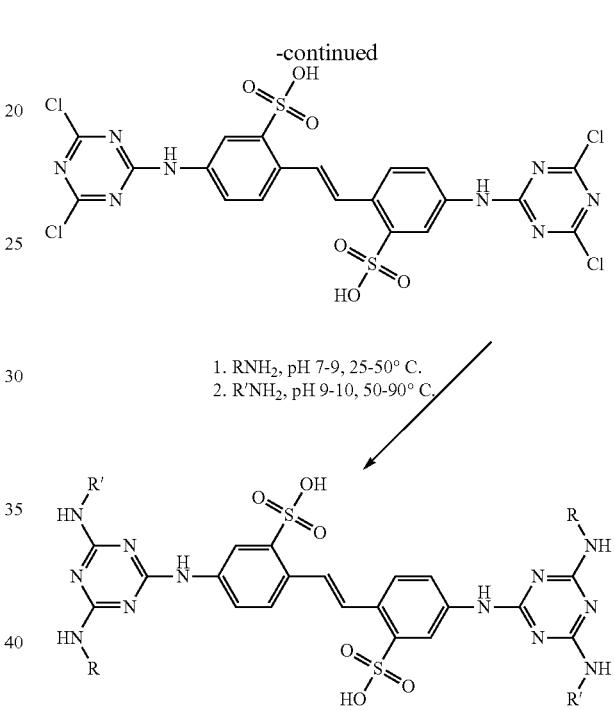

In this reaction scheme, the 4,4'-diaminostilbene-2,2'-disulfonic acid can be replaced with a 4,4'-diaminostilbene-2,2'-disulfonate salt, 4,4'-diaminostilbene-2,2'-dicarboxylic acid, or a 4,4'-diaminostilbene-2,2'-dicarboxylate salt.

More specifically, the above-depicted reaction can be carried out as described in this paragraph. Two equivalents of cyanuric chloride are dissolved in a water soluble organic solvent, preferably acetone, and added to cold water (0-5° C.) with efficient stirring to form a uniform dispersion. One equivalent of diaminostilbenedisulfonic acid dissolved in a aqueous solution of sodium carbonate is added at 0-5° C. and the mixture is stirred at 0-5° C. for two hours to form the diaminostilbenedisulfonic acid-bis-dichlorotriazine adduct. Next, two equivalents of an amine compound (e.g., aromatic amine or aliphatic amine) are added to the mixture and the pH is adjusted to approximately 7 with sodium carbonate or sodium hydroxide. The mixture is stirred for 3 hours at room temperature until the formation of the diaminostilbenedisulfonic acid-bis-(monochloro-monoaminotriazine) adduct has formed. Then, two additional equivalents of an amine (e.g., aromatic amine or aliphatic amine), which can be the same or different from the first amine used, are then added to the mixture and the pH adjusted to 9-10 with sodium hydroxide. The mixture is stirred at 50-80° C. until the diaminostilbenedisulfonic acid-bis-(aminotriazine) adduct has formed. The resulting product may be purified by lowering the pH, isolating the product that separates from the reaction mixture and drying it or redissolving it in water to form an aqueous solution.

In certain embodiments, the amine or alcohol compound used in the reaction described in the two preceding paragraphs can be a polyfunctional amine (e.g., an amine having two or more amine groups) or a polyfunctional alcohol (e.g., an alcohol having two or more hydroxyl groups). When such polyfunctional compounds are used, it is believed that the compound can react in the manner described above with the triazine groups present on two or more of the diaminostilbene compounds, thereby producing a compound in which two or more of the diaminostilbene moieties are linked by a substituent formed from this polyfunctional amine or alcohol compound. The polyfunctional amine and alcohol compounds suitable for use in such a reaction can be any polyfunctional amine or alcohol compound that will react with the diaminostilbene compound in the manner described above. Indeed, several of the suitable substituents described above contain two or more groups that can react with the triazine groups and, therefore, such substituents are believed to be suitable for producing a compound containing two or more diaminostilbene moieties.

In another process, the compounds conforming to the structure of Formula (XX) can be synthesized by first providing one equivalent of 4,4'-diaminostilbene-2,2'-disulfonic acid (or 4,4'-diaminostilbene-2,2'-dicarboxylic acid) and reacting it with sodium nitrite (approximately two equivalents) to produce the corresponding diazonium salt. This diazonium salt is then added to a cooled solution of an aniline derivative (approximately two equivalents) in water and stirred to yield the corresponding bis-diazo product. The bis-diazo product is then oxidized using a suitable oxidizing agent, such as sodium hypochlorite, to yield the corresponding 4,4'-bis-(5-N,N-substituted benzotriazole-2-yl)stilbene-2,2'-disulfonic acid product. A general reaction scheme depicting this process is set forth below:

In one specific example of such a process, one equivalent of 4,4'-diaminostilbene-2,2'-disulfonic acid is added to sufficient water to give an approximately 5% solution. Concentrated hydrochloric acid is added to give a pH of 1-2 and the mixture is cooled to 0-5° C. A solution of sodium nitrite (2.05 equivalents) in water is added over several minutes and the mixture stirred for two hours. The reaction produces a diazonium salt. This solution of the diazonium salt is added to a cooled solution of two equivalents of 4-N,N-dihydroxyethylsulfonamidoaniline in water and stirred for several hours to give the bis-diazo product. This mixture is then heated to 70-80° C. and oxidized with 5.2 equivalents of sodium hypochlorite to give the 4,4'-bis-(5-N,N-dihydroxyethylsulfonamidobenzotriazole-2-yl)stilbene-2,2'-disulfonic acid.

As noted above, the invention also provides laundry care compositions containing the above-described optical brighteners. As used herein, the term "laundry care composition" includes, unless otherwise indicated, granular, powder, liquid, gel, paste, bar form and/or flake type washing agents and/or fabric treatment compositions. As used herein, the term "fabric treatment composition" includes, unless otherwise indicated, fabric softening compositions, fabric enhancing compositions, fabric freshening compositions and combinations thereof. Such compositions may be, but need not be, rinse added compositions.

The optical brighteners described in the present specification may be incorporated into a laundry care composition including but not limited to laundry detergents and fabric care compositions. Such compositions comprise one or more of said optical brighteners and a laundry care ingredient. The laundry care compositions including laundry detergents may be in solid or liquid form, including a gel form. The laundry detergent composition comprises a surfactant in an amount sufficient to provide desired cleaning properties.

The optical brightener may be present in the laundry detergent composition in an amount from about 0.0001% to about

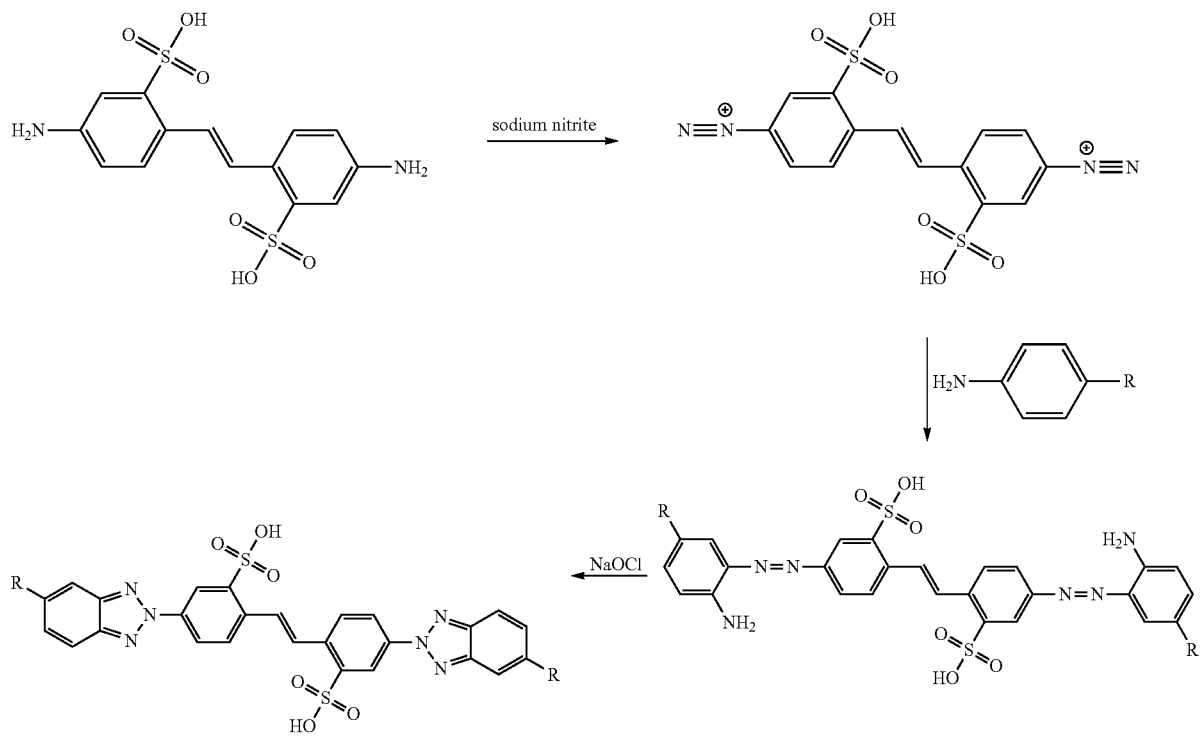

10% by weight of the composition, more preferably from about 0.0001% to about 5% by weight of the composition, and even more preferably from about 0.0001% to about 1% by weight of the composition.

The laundry detergent composition comprises a surfactant in an amount sufficient to provide desired cleaning properties. In one embodiment, the laundry detergent composition comprises, by weight, from about 5% to about 90% of the surfactant, and more specifically from about 5% to about 70% of the surfactant, and even more specifically from about 5% to about 40%. The surfactant may comprise anionic, nonionic, cationic, zwitterionic and/or amphoteric surfactants. In a more specific embodiment, the detergent composition comprises anionic surfactant, nonionic surfactant, or mixtures thereof.

Suitable anionic surfactants useful herein can comprise any of the conventional anionic surfactant types typically used in liquid detergent products. These include the alkyl benzene sulfonic acids and their salts as well as alkoxylated or non-alkoxylated alkyl sulfate materials.

Exemplary anionic surfactants are the alkali metal salts of $C_{10}$-$C_{16}$ alkyl benzene sulfonic acids, preferably $C_{11}$-$C_{14}$ alkyl benzene sulfonic acids. Preferably the alkyl group is linear and such linear alkyl benzene sulfonates are known as "LAS". Alkyl benzene sulfonates, and particularly LAS, are well known in the art. Such surfactants and their preparation are described for example in U.S. Pat. Nos. 2,220,099 and 2,477,383. Especially preferred are the sodium and potassium linear straight chain alkylbenzene sulfonates in which the average number of carbon atoms in the alkyl group is from about 11 to 14. Sodium $C_{11}$-$C_{14}$, e.g., $C_{12}$, LAS is a specific example of such surfactants.

Another exemplary type of anionic surfactant comprises ethoxylated alkyl sulfate surfactants. Such materials, also known as alkyl ether sulfates or alkyl polyethoxylate sulfates, are those which correspond to the formula: R'—O—$(C_2H_4O)_n$—$SO_3M$ wherein R' is a $C_8$-$C_{20}$ alkyl group, n is from about 1 to 20, and M is a salt-forming cation. In a specific embodiment, R' is $C_{10}$-$C_{18}$ alkyl, n is from about 1 to 15, and M is sodium, potassium, ammonium, alkylammonium, or alkanolammonium. In more specific embodiments, R' is a $C_{12}$-$C_{16}$ alkyl, n is from about 1 to 6, and M is sodium.

The alkyl ether sulfates will generally be used in the form of mixtures comprising varying R' chain lengths and varying degrees of ethoxylation. Frequently such mixtures will inevitably also contain some non-ethoxylated alkyl sulfate materials, i.e., surfactants of the above ethoxylated alkyl sulfate formula wherein n=0. Non-ethoxylated alkyl sulfates may also be added separately to the compositions of this invention and used as or in any anionic surfactant component which may be present. Specific examples of non-alkoxylated, e.g., non-ethoxylated, alkyl ether sulfate surfactants are those produced by the sulfation of higher $C_8$-$C_{20}$ fatty alcohols. Conventional primary alkyl sulfate surfactants have the general formula: $ROSO_3^-M^+$ wherein R is typically a linear $C_8$-$C_{20}$ hydrocarbyl group, which may be straight chain or branched chain, and M is a water-solubilizing cation. In specific embodiments, R is a $C_{10}$-$C_{15}$ alkyl, and M is alkali metal, more specifically R is $C_{12}$-$C_{14}$ and M is sodium.

Specific, non-limiting examples of anionic surfactants useful herein include: a) $C_{11}$-$C_{18}$ alkyl benzene sulfonates (LAS); b) $C_{10}$-$C_{20}$ primary, branched-chain and random alkyl sulfates (AS); c) $C_{10}$-$C_{18}$ secondary (2,3) alkyl sulfates having formulae (I) and (II): wherein M in formulae (I) and (II) is hydrogen or a cation which provides charge neutrality, and all M units, whether associated with a surfactant or adjunct ingredient, can either be a hydrogen atom or a cation depending upon the form isolated by the artisan or the relative pH of the system wherein the compound is used, with non-limiting examples of preferred cations including sodium, potassium, ammonium, and mixtures thereof, and x is an integer of at least about 7, preferably at least about 9, and y is an integer of at least about 8, preferably at least about 9; d) $C_{10}$-$C_{18}$ alkyl alkoxy sulfates ($AE_xS$) wherein preferably x is from 1-30; e) $C_{10}$-$C_{18}$ alkyl alkoxy carboxylates preferably comprising 1-5 ethoxy units; f) mid-chain branched alkyl sulfates as discussed in U.S. Pat. No. 6,020,303 and U.S. Pat. No. 6,060,443; g) mid-chain branched alkyl alkoxy sulfates as discussed in U.S. Pat. No. 6,008,181 and U.S. Pat. No. 6,020,303; h) modified alkylbenzene sulfonate (MLAS) as discussed in WO 99/05243, WO 99/05242, WO 99/05244, WO 99/05082, WO 99/05084, WO 99/05241, WO 99/07656, WO 00/23549, and WO 00/23548; i) methyl ester sulfonate (MES); and j) alpha-olefin sulfonate (AOS).

Suitable nonionic surfactants useful herein can comprise any of the conventional nonionic surfactant types typically used in liquid detergent products. These include alkoxylated fatty alcohols and amine oxide surfactants. Preferred for use in the liquid detergent products herein are those nonionic surfactants which are normally liquid.

Suitable nonionic surfactants for use herein include the alcohol alkoxylate nonionic surfactants. Alcohol alkoxylates are materials which correspond to the general formula: $R^1(C_mH_{2m}O)_nOH$ wherein $R^1$ is a $C_8$-$C_{16}$ alkyl group, m is from 2 to 4, and n ranges from about 2 to 12. Preferably $R^1$ is an alkyl group, which may be primary or secondary, that comprises from about 9 to 15 carbon atoms, more preferably from about 10 to 14 carbon atoms. In one embodiment, the alkoxylated fatty alcohols will also be ethoxylated materials that contain from about 2 to 12 ethylene oxide moieties per molecule, more preferably from about 3 to 10 ethylene oxide moieties per molecule.

The alkoxylated fatty alcohol materials useful in the liquid detergent compositions herein will frequently have a hydrophilic-lipophilic balance (HLB) which ranges from about 3 to 17. More preferably, the HLB of this material will range from about 6 to 15, most preferably from about 8 to 15. Alkoxylated fatty alcohol nonionic surfactants have been marketed under the tradenames Neodol and Dobanol by the Shell Chemical Company.

Another suitable type of nonionic surfactant useful herein comprises the amine oxide surfactants. Amine oxides are materials which are often referred to in the art as "semi-polar" nonionics. Amine oxides have the formula: $R(EO)_x(PO)_y(BO)_zN(O)(CH_2R')_2 \cdot qH_2O$. In this formula, R is a relatively long-chain hydrocarbyl moiety which can be saturated or unsaturated, linear or branched, and can contain from 8 to 20, preferably from 10 to 16 carbon atoms, and is more preferably $C_{12}$-$C_{16}$ primary alkyl. R' is a short-chain moiety, preferably selected from hydrogen, methyl and —$CH_2OH$. When x+y+z is different from 0, EO is ethyleneoxy, PO is propyleneneoxy and BO is butyleneoxy. Amine oxide surfactants are illustrated by $C_{12}$-$C_{14}$ alkyldimethyl amine oxide.

Non-limiting examples of nonionic surfactants include: a) $C_{12}$-$C_{18}$ alkyl ethoxylates, such as, NEODOL® nonionic surfactants from Shell; b) $C_6$-$C_{12}$ alkyl phenol alkoxylates wherein the alkoxylate units are a mixture of ethyleneoxy and propyleneoxy units; c) $C_{12}$-$C_{18}$ alcohol and $C_6$-$C_{12}$ alkyl phenol condensates with ethylene oxide/propylene oxide block polymers such as Pluronic® from BASF; d) $C_{14}$-$C_{22}$ mid-chain branched alcohols, BA, as discussed in U.S. Pat. No. 6,150,322; e) $C_{14}$-$C_{22}$ mid-chain branched alkyl alkoxylates, $BAE_x$, wherein x is from 1-30, as discussed in U.S. Pat. No. 6,153,577, U.S. Pat. No. 6,020,303 and U.S. Pat. No. 6,093,856; f) Alkylpolysaccharides as discussed in U.S. Pat. No.

4,565,647 to Llenado, issued Jan. 26, 1986; specifically alkylpolyglycosides as discussed in U.S. Pat. No. 4,483,780 and U.S. Pat. No. 4,483,779; g) Polyhydroxy fatty acid amides as discussed in U.S. Pat. No. 5,332,528, WO 92/06162, WO 93/19146, WO 93/19038, and WO 94/09099; and h) ether capped poly(oxyalkylated) alcohol surfactants as discussed in U.S. Pat. No. 6,482,994 and WO 01/42408.

In the laundry detergent compositions herein, the detersive surfactant component may comprise combinations of anionic and nonionic surfactant materials. When this is the case, the weight ratio of anionic to nonionic will typically range from 10:90 to 90:10, more typically from 30:70 to 70:30.

Cationic surfactants are well known in the art and non-limiting examples of these include quaternary ammonium surfactants, which can have up to 26 carbon atoms. Additional examples include a) alkoxylate quaternary ammonium (AQA) surfactants as discussed in U.S. Pat. No. 6,136,769; b) dimethyl hydroxyethyl quaternary ammonium as discussed in U.S. Pat. No. 6,004,922; c) polyamine cationic surfactants as discussed in WO 98/35002, WO 98/35003, WO 98/35004, WO 98/35005, and WO 98/35006; d) cationic ester surfactants as discussed in U.S. Pat. Nos. 4,228,042, 4,239,660 4,260,529 and U.S. Pat. No. 6,022,844; and e) amino surfactants as discussed in U.S. Pat. No. 6,221,825 and WO 00/47708, specifically amido propyldimethyl amine (APA).

Non-limiting examples of zwitterionic surfactants include derivatives of secondary and tertiary amines, derivatives of heterocyclic secondary and tertiary amines, or derivatives of quaternary ammonium, quaternary phosphonium or tertiary sulfonium compounds. See U.S. Pat. No. 3,929,678 to Laughlin et al., issued Dec. 30, 1975 at column 19, line 38 through column 22, line 48, for examples of zwitterionic surfactants; betaine, including alkyl dimethyl betaine and cocodimethyl amidopropyl betaine, $C_8$ to $C_{18}$ (preferably $C_{12}$ to $C_{18}$) amine oxides and sulfo and hydroxy betaines, such as N-alkyl-N,N-dimethylammino-1-propane sulfonate where the alkyl group can be $C_8$ to $C_{18}$, preferably $C_{10}$ to $C_{14}$.

Non-limiting examples of ampholytic surfactants include aliphatic derivatives of secondary or tertiary amines, or aliphatic derivatives of heterocyclic secondary and tertiary amines in which the aliphatic radical can be straight- or branched-chain. One of the aliphatic substituents comprises at least about 8 carbon atoms, typically from about 8 to about 18 carbon atoms, and at least one comprises an anionic water-solubilizing group, e.g. carboxy, sulfonate, sulfate. See U.S. Pat. No. 3,929,678 to Laughlin et al., issued Dec. 30, 1975 at column 19, lines 18-35, for examples of ampholytic surfactants.

As noted, the compositions may be in the form of a solid, either in tablet or particulate form, including, but not limited to particles, flakes, or the like, or the compositions may be in the form of a liquid. The liquid detergent compositions comprise an aqueous, non-surface active liquid carrier. Generally, the amount of the aqueous, non-surface active liquid carrier employed in the compositions herein will be effective to solubilize, suspend or disperse the composition components. For example, the compositions may comprise, by weight, from about 5% to about 90%, more specifically from about 10% to about 70%, and even more specifically from about 20% to about 70% of the aqueous, non-surface active liquid carrier.

The most cost effective type of aqueous, non-surface active liquid carrier is, of course, water itself. Accordingly, the aqueous, non-surface active liquid carrier component will generally be mostly, if not completely, comprised of water. While other types of water-miscible liquids, such alkanols, diols, other polyols, ethers, amines, and the like, have been conventionally been added to liquid detergent compositions as co-solvents or stabilizers, for purposes of the present invention, the utilization of such water-miscible liquids should be minimized to hold down composition cost. Accordingly, the aqueous liquid carrier component of the liquid detergent products herein will generally comprise water present in concentrations ranging from about 5% to about 90%, more preferably from about 20% to about 70%, by weight of the composition.

Detergent compositions may also contain bleaching agents. Suitable bleaching agents include, for example, hydrogen peroxide sources, such as those described in detail in the herein incorporated Kirk Othmer's Encyclopedia of Chemical Technology, 4th Ed (1992, John Wiley & Sons), Vol. 4, pp. 271-300 "Bleaching Agents (Survey)." These hydrogen peroxide sources include the various forms of sodium perborate and sodium percarbonate, including various coated and modified forms of these compounds.

The preferred source of hydrogen peroxide used herein can be any convenient source, including hydrogen peroxide itself. For example, perborate, e.g., sodium perborate (any hydrate but preferably the mono- or tetra-hydrate), sodium carbonate peroxyhydrate or equivalent percarbonate salts, sodium pyrophosphate peroxyhydrate, urea peroxyhydrate, or sodium peroxide can be used herein. Also useful are sources of available oxygen such as persulfate bleach (e.g., OXONE, manufactured by DuPont). Sodium perborate monohydrate and sodium percarbonate are particularly preferred. Mixtures of any convenient hydrogen peroxide sources can also be used.

A suitable percarbonate bleach comprises dry particles having an average particle size in the range from about 500 micrometers to about 1,000 micrometers, not more than about 10% by weight of said particles being smaller than about 200 micrometers and not more than about 10% by weight of said particles being larger than about 1,250 micrometers. Optionally, the percarbonate can be coated with a silicate, borate or water-soluble surfactants. Percarbonate is available from various commercial sources such as FMC, Solvay and Tokai Denka.

Compositions of the present invention may also comprise as the bleaching agent a chlorine-type bleaching material. Such agents are well known in the art, and include for example sodium dichloroisocyanurate ("NaDCC"). However, chlorine-type bleaches are less preferred for compositions which comprise enzymes.

(a) Bleach Activators—

Preferably, the peroxygen bleach component in the composition is formulated with an activator (peracid precursor). The activator is present at levels of from about 0.01%, preferably from about 0.5%, more preferably from about 1% to about 15%, preferably to about 10%, more preferably to about 8%, by weight of the composition. A bleach activator as used herein is any compound which, when used in conjunction with a hydrogen peroxide, source leads to the in situ production of the peracid corresponding to the bleach activator. Various non-limiting examples of activators are disclosed in U.S. Pat. Nos. 5,576,282; 4,915,854 and 4,412,934. See also U.S. Pat. No. 4,634,551 for other typical bleaches and activators useful herein.

Preferred activators are selected from the group consisting of tetraacetyl ethylene diamine (TAED), benzoylcaprolactam (BzCL), 4-nitrobenzoylcaprolactam, 3-chlorobenzoylcaprolactam, benzoyloxybenzenesulphonate (BOBS), nonanoyloxybenzenesulphonate (NOBS), phenyl benzoate (PhBz), decanoyloxybenzenesulphonate ($C_{10}$-OBS), benzoylvalerolactam (BZVL), octanoyloxybenzenesulphonate ($C_8$-OBS), perhydrolyzable esters and mixtures thereof, most preferably benzoylcaprolactam and benzoylvalerolactam. Particularly preferred bleach activators in the pH range from about 8 to about 11 are those selected having an OBS or VL leaving group.

Preferred hydrophobic bleach activators include, but are not limited to, nonanoyloxybenzenesulphonate (NOBS); 4-[N-(nonanoyl)amino hexanoyloxy]-benzene sulfonate sodium salt (NACA-OBS), an example of which is described in U.S. Pat. No. 5,523,434; dodecanoyloxybenzenesulphonate (LOBS or $C_{12}$-OBS); 10-undecenoyloxybenzenesulfonate (UDOBS or $C_{11}$-OBS with unsaturation in the 10 position); and decanoyloxybenzoic acid (DOBA).

Preferred bleach activators are those described in U.S. Pat. No. 5,998,350 to Burns et al.; U.S. Pat. No. 5,698,504 to Christie et al.; U.S. Pat. No. 5,695,679 to Christie et al.; U.S. Pat. No. 5,686,401 to Willey et al.; U.S. Pat. No. 5,686,014 to Hartshorn et al.; U.S. Pat. No. 5,405,412 to Willey et al.; U.S. Pat. No. 5,405,413 to Willey et al.; U.S. Pat. No. 5,130,045 to Mitchel et al.; and U.S. Pat. No. 4,412,934 to Chung et al., all of which are incorporated herein by reference.

The mole ratio of peroxygen source (as AvO) to bleach activator in the present invention generally ranges from at least 1:1, preferably from about 20:1, more preferably from about 10:1 to about 1:1, preferably to about 3:1.

Quaternary substituted bleach activators may also be included. The present laundry compositions preferably comprise a quaternary substituted bleach activator (QSBA) or a quaternary substituted peracid (QSP, preferably a quaternary substituted percarboxylic acid or a quaternary substituted peroxyimidic acid); more preferably, the former. Preferred QSBA structures are further described in U.S. Pat. No. 5,686,015 to Willey et al.; U.S. Pat. No. 5,654,421 to Taylor et al.; U.S. Pat. No. 5,460,747 to Gosselink et al.; U.S. Pat. No. 5,584,888 to Miracle et al.; U.S. Pat. No. 5,578,136 to Taylor et al.; all of which are incorporated herein by reference.

Highly preferred bleach activators useful herein are amide-substituted as described in U.S. Pat. Nos. 5,698,504; 5,695,679; and 5,686,014, each of which are cited herein above. Preferred examples of such bleach activators include: (6-octanamidocaproyl) oxybenzenesulfonate, (6-nonanamidocaproyl)oxybenzenesulfonate, (6-decanamidocaproyl) oxybenzenesulfonate and mixtures thereof.

Other useful activators are disclosed in U.S. Pat. Nos. 5,698,504; 5,695,679; and 5,686,014, each of which is cited herein above, and in U.S. Pat. No. 4,966,723 to Hodge et al. These activators include benzoxazin-type activators, such as a $C_6H_4$ ring to which is fused in the 1,2-positions a moiety —C(O)OC($R^1$)=N—.

Nitriles, such as acetonitriles and/or ammonium nitriles and other quaternary nitrogen containing nitriles, are another class of activators that are useful herein. Non-limiting examples of such nitrile bleach activators are described in U.S. Pat. Nos. 6,133,216; 3,986,972; 6,063,750; 6,017,464; 5,958,289; 5,877,315; 5,741,437; 5,739,327; 5,004,558; and in EP Nos. 790 244, 775 127, 1 017 773, 1 017 776; and in WO 99/14302, WO 99/14296, WO96/40661, all of which are incorporated herein by reference.

Depending on the activator and precise application, good bleaching results can be obtained from bleaching systems having an in-use pH of from about 6 to about 13, and preferably from about 9.0 to about 10.5. Typically, for example, activators with electron-withdrawing moieties are used for near-neutral or sub-neutral pH ranges. Alkalis and buffering agents can be used to secure such pH.

Acyl lactam activators, as described in U.S. Pat. Nos. 5,698,504; 5,695,679 and 5,686,014, each of which is cited herein above, are very useful herein, especially the acyl caprolactams (see for example WO 94-28102 A) and acyl valerolactams (see U.S. Pat. No. 5,503,639 to Willey et al. incorporated herein by reference).

(b) Organic Peroxides, especially Diacyl Peroxides—

These are extensively illustrated in Kirk Othmer, Encyclopedia of Chemical Technology, Vol. 17, John Wiley and Sons, 1982 at pages 27-90 and especially at pages 63-72, all incorporated herein by reference. If a diacyl peroxide is used, it will preferably be one which exerts minimal adverse impact on fabric care, including color care.

(c) Metal-Containing Bleach Catalysts—

The compositions and methods of the present invention can also optionally include metal-containing bleach catalysts, preferably manganese and cobalt-containing bleach catalysts.

One type of metal-containing bleach catalyst is a catalyst system comprising a transition metal cation of defined bleach catalytic activity (such as copper, iron, titanium, ruthenium tungsten, molybdenum, or manganese cations), an auxiliary metal cation having little or no bleach catalytic activity (such as zinc or aluminum cations), and a sequestrate having defined stability constants for the catalytic and auxiliary metal cations, particularly ethylenediaminetetraacetic acid, ethylenediaminetetra (methylenephosphonic acid) and water-soluble salts thereof. Such catalysts are disclosed in U.S. Pat. No. 4,430,243 to Bragg.

Manganese Metal Complexes—

If desired, the compositions herein can be catalyzed by means of a manganese compound. Such compounds and levels of use are well known in the art and include, for example, the manganese-based catalysts disclosed in U.S. Pat. Nos. 5,576,282; 5,246,621; 5,244,594; 5,194,416; and 5,114,606; and European Pat. App. Pub. Nos. 549,271 A1; 549,272 A1; 544,440 A2; and 544,490 A1. Preferred examples of these catalysts include $Mn(IV)_2(u-O)_3(1,4,7$-trimethyl-1,4,7-triazacyclononane$)_2(PF_6)_2$, $Mn(III)_2(u-O)_1(u-OAc)_2(1,4,7$-trimethyl-1,4,7-triazacyclononane$)_2(ClO_4)_2$, $Mn(IV)_4(u-O)_6$ $(1,4,7$-triazacyclononane$)_4(ClO_4)_4$, $Mn(III)Mn(IV)_4(u-O)_1$ $(u-OAc)$-2-$(1,4,7$-trimethyl-1,4,7-triazacyclononane$)_2$ $(ClO_4)_3$, $Mn(IV)(1,4,7$-trimethyl-1,4,7-triazacyclononane$)$-$(OCH_3)_3(PF_6)$, and mixtures thereof. Other metal-based bleach catalysts include those disclosed in U.S. Pat. Nos. 4,430,243 and 5,114,611. The use of manganese with various complex ligands to enhance bleaching is also reported in the following: U.S. Pat. Nos. 4,728,455; 5,284,944; 5,246,612; 5,256,779; 5,280,117; 5,274,147; 5,153,161; and 5,227,084.

Cobalt Metal Complexes—

Cobalt bleach catalysts useful herein are known, and are described, for example, in U.S. Pat. Nos. 5,597,936; 5,595,967; and 5,703,030; and M. L. To be, "Base Hydrolysis of Transition-Metal Complexes", *Adv. Inorg. Bioinorg. Mech.*, (1983), 2, pages 1-94. The most preferred cobalt catalyst useful herein are cobalt pentaamine acetate salts having the formula $[Co(NH_3)_5OAc]Ty$, wherein "OAc" represents an acetate moiety and "Ty" is an anion, and especially cobalt pentaamine acetate chloride, $[Co(NH_3)_5OAc]Cl_2$; as well as $[Co(NH_3)_5OAc](OAc)_2$; $[Co(NH_3)_5OAc](PF_6)_2$; $[Co(NH_3)_5OAc](SO_4)$; $[Co(NH_3)_5OAc](BF_4)_2$; and $[Co(NH_3)_5OAc](NO_3)_2$ (herein "PAC").

These cobalt catalysts are readily prepared by known procedures, such as taught for example in U.S. Pat. Nos. 6,302,921; 6,287,580; 6,140,294; 5,597,936; 5,595,967; and 5,703,030; in the Tobe article and the references cited therein; and in U.S. Pat. No. 4,810,410; *J. Chem. Ed.* (1989), 66 (12), 1043-45; The Synthesis and Characterization of Inorganic Compounds, W.L. Jolly (Prentice-Hall; 1970), pp. 461-3; *Inorg. Chem.*, 18, 1497-1502 (1979); *Inorg. Chem.*, 21, 2881-2885

(1982); *Inorg. Chem.*, 18, 2023-2025 (1979); *Inorg. Synthesis*, 173-176 (1960); and *Journal of Physical Chemistry*, 56, 22-25 (1952).

Transition Metal Complexes of Macropolycyclic Rigid Ligands—

Compositions herein may also suitably include as bleach catalyst a transition metal complex of a macropolycyclic rigid ligand. The amount used is a catalytically effective amount, suitably about 1 ppb or more, for example up to about 99.9%, more typically about 0.001 ppm or more, preferably from about 0.05 ppm to about 500 ppm (wherein "ppb" denotes parts per billion by weight and "ppm" denotes parts per million by weight).

Transition-metal bleach catalysts of Macrocyclic Rigid Ligands which are suitable for use in the invention compositions can in general include known compounds where they conform with the definition herein, as well as, more preferably, any of a large number of novel compounds expressly designed for the present laundry or laundry uses, and are non-limitingly illustrated by any of the following:

Dichloro-5,12-dimethyl-1,5,8,12-tetraazabicyclo[6.6.2]hexadecane Manganese(II)
Dichloro-5,12-diethyl-1,5,8,12-tetraazabicyclo[6.6.2]hexadecane Manganese(II)
Diaquo-5,12-dimethyl-1,5,8,12-tetraazabicyclo[6.6.2]hexadecaneManganese(II) Hexafluorophosphate
Diaquo-5,12-diethyl-1,5,8,12-tetraazabicyclo[6.6.2]hexadecaneManganese(II) Hexafluorophosphate
Aquo-hydroxy-5,12-dimethyl-1,5,8,12-tetraazabicyclo[6.6.2]hexadecane Manganese(III) Hexafluorophosphate
Diaquo-5,12-dimethyl-1,5,8,12-tetraazabicyclo[6.6.2]hexadecaneManganese(II) Tetrafluoroborate
Dichloro-5,12-dimethyl-1,5,8,12 tetraazabicyclo[6.6.2]hexadecane Manganese(III) Hexafluorophosphate
Dichloro-5,12-diethyl-1,5,8,12-tetraazabicyclo[6.6.2]hexadecane Manganese(III) Hexafluorophosphate
Dichloro-5,12-di-n-butyl-1,5,8,12-tetraaza bicyclo[6.6.2]hexadecane Manganese(II)
Dichloro-5,12-dibenzyl-1,5,8,12-tetraazabicyclo[6.6.2]hexadecane Manganese(II)
Dichloro-5-n-butyl-12-methyl-1,5,8,12-tetraaza-bicyclo[6.6.2]hexadecane Manganese(II)
Dichloro-5-n-octyl-12-methyl-1,5,8,12-tetraaza-bicyclo[6.6.2]hexadecane Manganese(II)
Dichloro-5-n-butyl-12-methyl-1,5,8,12-tetraaza-bicyclo[6.6.2]hexadecane Manganese(II).

As a practical matter, and not by way of limitation, the compositions and methods herein can be adjusted to provide on the order of at least one part per hundred million of the active bleach catalyst species in the composition comprising a lipophilic fluid and a bleach system, and will preferably provide from about 0.01 ppm to about 25 ppm, more preferably from about 0.05 ppm to about 10 ppm, and most preferably from about 0.1 ppm to about 5 ppm, of the bleach catalyst species in the composition comprising a lipophilic fluid and a bleach system.

(d) Bleach Boosting Compounds—

The compositions herein may comprise one or more bleach boosting compounds. Bleach boosting compounds provide increased bleaching effectiveness in lower temperature applications. The bleach boosters act in conjunction with conventional peroxygen bleaching sources to provide increased bleaching effectiveness. This is normally accomplished through in situ formation of an active oxygen transfer agent such as a dioxirane, an oxaziridine, or an oxaziridinium. Alternatively, preformed dioxiranes, oxaziridines and oxaziridiniums may be used.

Among suitable bleach boosting compounds for use in accordance with the present invention are cationic imines, zwitterionic imines, anionic imines and/or polyionic imines having a net charge of from about +3 to about −3, and mixtures thereof. These imine bleach boosting compounds of the present invention include those of the general structure:

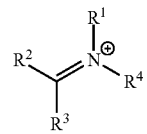

where $R^1$-$R^4$ may be a hydrogen or an unsubstituted or substituted radical selected from the group consisting of phenyl, aryl, heterocyclic ring, alkyl and cycloalkyl radicals.

Among preferred bleach boosting compounds are zwitterionic bleach boosters, which are described in U.S. Pat. Nos. 5,576,282 and 5,718,614. Other bleach boosting compounds include cationic bleach boosters described in U.S. Pat. Nos. 5,360,569; 5,442,066; 5,478,357; 5,370,826; 5,482,515; 5,550,256; and WO 95/13351, WO 95/13352, and WO 95/13353.

Peroxygen sources are well-known in the art and the peroxygen source employed in the present invention may comprise any of these well known sources, including peroxygen compounds as well as compounds, which under consumer use conditions, provide an effective amount of peroxygen in situ. The peroxygen source may include a hydrogen peroxide source, the in situ formation of a peracid anion through the reaction of a hydrogen peroxide source and a bleach activator, preformed peracid compounds or mixtures of suitable peroxygen sources. Of course, one of ordinary skill in the art will recognize that other sources of peroxygen may be employed without departing from the scope of the invention. The bleach boosting compounds, when present, are preferably employed in conjunction with a peroxygen source in the bleaching systems of the present invention.

(e) Preformed Peracids—

Also suitable as bleaching agents are preformed peracids. The preformed peracid compound as used herein is any convenient compound which is stable and which under consumer use conditions provides an effective amount of peracid or peracid anion. The preformed peracid compound may be selected from the group consisting of percarboxylic acids and salts, percarbonic acids and salts, perimidic acids and salts, peroxymonosulfuric acids and salts, and mixtures thereof. Examples of these compounds are described in U.S. Pat. No. 5,576,282 to Miracle et al.

One class of suitable organic peroxycarboxylic acids have the general formula:

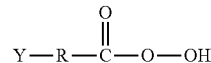

wherein R is an alkylene or substituted alkylene group containing from 1 to about 22 carbon atoms or a phenylene or substituted phenylene group, and Y is hydrogen, halogen, alkyl, aryl, —C(O)OH or —C(O)OOH.

Organic peroxyacids suitable for use in the present invention can contain either one or two peroxy groups and can be either aliphatic or aromatic. When the organic peroxycarboxylic acid is aliphatic, the unsubstituted peracid has the general formula:

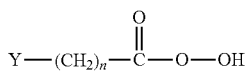

wherein Y can be, for example, H, $CH_3$, $CH_2Cl$, $C(O)OH$, or $C(O)OOH$; and n is an integer from 0 to 20. When the organic peroxycarboxylic acid is aromatic, the unsubstituted peracid has the general formula:

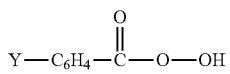

wherein Y can be, for example, hydrogen, alkyl, alkylhalogen, halogen, $C(O)OH$ or $C(O)OOH$.

Typical monoperoxy acids useful herein include alkyl and aryl peroxyacids such as:

(i) peroxybenzoic acid and ring-substituted peroxybenzoic acid, e.g. peroxy-a-naphthoic acid, monoperoxyphthalic acid (magnesium salt hexahydrate), and o-carboxybenzamidoperoxyhexanoic acid (sodium salt);

(ii) aliphatic, substituted aliphatic and arylalkyl monoperoxy acids, e.g. peroxylauric acid, peroxystearic acid, N-nonanoylaminoperoxycaproic acid (NAPCA), N,N-(3-octylsuccinoyl)aminoperoxycaproic acid (SAPA) and N,N-phthaloylaminoperoxycaproic acid (PAP);

(iii) amidoperoxyacids, e.g. mononitrile of either peroxysuccinic acid (NAPSA) or of peroxyadipic acid (NAPAA).

Typical diperoxyacids useful herein include alkyl diperoxyacids and aryldiperoxyacids, such as:

(i) 1,12-diperoxydodecanedioic acid;
(ii) 1,9-diperoxyazelaic acid;
(iii) diperoxybrassylic acid; diperoxysebacic acid and diperoxyisophthalic acid;
(iv) 2-decyldiperoxybutane-1,4-dioic acid;
(v) 4,4'-sulfonylbisperoxybenzoic acid.

Such bleaching agents are disclosed in U.S. Pat. Nos. 4,483,781 to Hartman and 4,634,551 to Burns et al.; European Patent Application 0,133,354 to Banks et al.; and U.S. Pat. No. 4,412,934 to Chung et al. Sources also include 6-nonylamino-6-oxoperoxycaproic acid as described in U.S. Pat. No. 4,634,551 to Burns et al. Persulfate compounds such as for example OXONE, manufactured commercially by E.I. DuPont de Nemours of Wilmington, Del. can also be employed as a suitable source of peroxymonosulfuric acid. PAP is disclosed in, for example, U.S. Pat. Nos. 5,487,818; 5,310,934; 5,246,620; 5,279,757 and 5,132,431.

(f) Photobleaches—

Suitable photobleaches for use in the treating compositions of the present invention include, but are not limited to, the photobleaches described in U.S. Pat. Nos. 4,217,105 and 5,916,481.

(g) Enzyme Bleaching—

Enzymatic systems may be used as bleaching agents. The hydrogen peroxide may also be present by adding an enzymatic system (i.e. an enzyme and a substrate therefore) which is capable of generating hydrogen peroxide at the beginning or during the washing and/or rinsing process. Such enzymatic systems are disclosed in EP Patent Application 91202655.6 filed Oct. 9, 1991.

The present invention compositions and methods may utilize alternative bleach systems such as ozone, chlorine dioxide and the like. Bleaching with ozone may be accomplished by introducing ozone-containing gas having ozone content from about 20 to about 300 $g/m^3$ into the solution that is to contact the fabrics. The gas:liquid ratio in the solution should be maintained from about 1:2.5 to about 1:6. U.S. Pat. No. 5,346,588 describes a process for the utilization of ozone as an alternative to conventional bleach systems and is herein incorporated by reference.

The detergent compositions of the present invention may also include any number of additional optional ingredients. These include conventional laundry detergent composition components such as non-tinting dyes, detersive builders, enzymes, enzyme stabilizers (such as propylene glycol, boric acid and/or borax), suds suppressors, soil suspending agents, soil release agents, other fabric care benefit agents, pH adjusting agents, chelating agents, smectite clays, solvents, hydrotropes and phase stabilizers, structuring agents, dye transfer inhibiting agents, opacifying agents, optical brighteners, perfumes and coloring agents. The various optional detergent composition ingredients, if present in the compositions herein, should be utilized at concentrations conventionally employed to bring about their desired contribution to the composition or the laundering operation. Frequently, the total amount of such optional detergent composition ingredients can range from about 0.01% to about 50%, more preferably from about 0.1% to about 30%, by weight of the composition.

The liquid detergent compositions are in the form of an aqueous solution or uniform dispersion or suspension of surfactant, optical brightener, and certain optional other ingredients, some of which may normally be in solid form, that have been combined with the normally liquid components of the composition, such as the liquid alcohol ethoxylate nonionic, the aqueous liquid carrier, and any other normally liquid optional ingredients. Such a solution, dispersion or suspension will be acceptably phase stable and will typically have a viscosity which ranges from about 100 to 600 cps, more preferably from about 150 to 400 cps. For purposes of this invention, viscosity is measured with a Brookfield LVDV-II+ viscometer apparatus using a #21 spindle.

The liquid detergent compositions herein can be prepared by combining the components thereof in any convenient order and by mixing, e.g., agitating, the resulting component combination to form a phase stable liquid detergent composition. In a preferred process for preparing such compositions, a liquid matrix is formed containing at least a major proportion, and preferably substantially all, of the liquid components, e.g., nonionic surfactant, the non-surface active liquid carriers and other optional liquid components, with the liquid components being thoroughly admixed by imparting shear agitation to this liquid combination. For example, rapid stirring with a mechanical stirrer may usefully be employed. While shear agitation is maintained, substantially all of any anionic surfactants and the solid form ingredients can be added. Agitation of the mixture is continued, and if necessary, can be increased at this point to form a solution or a uniform dispersion of insoluble solid phase particulates within the liquid phase. After some or all of the solid-form materials have been added to this agitated mixture, particles of any enzyme material to be included, e.g., enzyme prills, are incorporated. As a variation of the composition preparation procedure hereinbefore described, one or more of the solid components may be added to the agitated mixture as a solution or slurry of particles premixed with a minor portion of one or more of the liquid components. After addition of all of the composition components, agitation of the mixture is continued for a period of time sufficient to form compositions having the requisite viscosity and phase stability characteristics. Frequently this will involve agitation for a period of from about 30 to 60 minutes.

In an alternate embodiment for forming the liquid detergent compositions, the optical brightener is first combined with one or more liquid components to form a optical brightener premix, and this optical brightener premix is added to a composition formulation containing a substantial portion, for example more than 50% by weight, more specifically, more than 70% by weight, and yet more specifically, more than 90% by weight, of the balance of components of the laundry detergent composition. For example, in the methodology described above, both the optical brightener premix and the enzyme component are added at a final stage of component additions. In a further embodiment, the optical brightener is encapsulated prior to addition to the detergent composition, the encapsulated optical brightener is suspended in a structured liquid, and the suspension is added to a composition formulation containing a substantial portion of the balance of components of the laundry detergent composition.

As noted previously, the detergent compositions may be in a solid form. Suitable solid forms include tablets and particulate forms, for example, granular particles or flakes. Various techniques for forming detergent compositions in such solid forms are well known in the art and may be used herein. In one embodiment, for example when the composition is in the form of a granular particle, the optical brightener is provided in particulate form, optionally including additional but not all components of the laundry detergent composition. The optical brightener particulate is combined with one or more additional particulates containing a balance of components of the laundry detergent composition. Further, the optical brightener, optionally including additional but not all components of the laundry detergent composition, may be provided in an encapsulated form, and the optical brightener encapsulate is combined with particulates containing a substantial balance of components of the laundry detergent composition.

The compositions of this invention, prepared as hereinbefore described, can be used to form aqueous washing solutions for use in the laundering of fabrics. Generally, an effective amount of such compositions is added to water, preferably in a conventional fabric laundering automatic washing machine, to form such aqueous laundering solutions. The aqueous washing solution so formed is then contacted, preferably under agitation, with the fabrics to be laundered therewith. An effective amount of the liquid detergent compositions herein added to water to form aqueous laundering solutions can comprise amounts sufficient to form from about 500 to 7,000 ppm of composition in aqueous washing solution. More preferably, from about 1,000 to 3,000 ppm of the detergent compositions herein will be provided in aqueous washing solution.

Fabric Care Compositions/Rinse Added Fabric Softening Compositions

In another specific embodiment, the optical brighteners of the present invention may be included in a fabric care composition. The fabric care composition may be comprised of at least one optical brightener and a rinse added fabric softening composition ("RAFS;" also known as rinse added fabric conditioning compositions). Examples of typical rinse added softening compositions can be found in U.S. Provisional Patent Application Ser. No. 60/687,582 filed on Oct. 8, 2004. The rinse added fabric softening compositions of the present invention may comprise (a) fabric softening active and (b) a thiazolium dye. The rinse added fabric softening composition may comprise from about 1% to about 90% by weight of the FSA, more preferably from about 5% to about 50% by weight of the FSA. The optical brightener may be present in the rinse added fabric softening composition in an amount from about 0.5 ppb to about 50 ppm, more preferably from about 0.5 ppm to about 30 ppm.

In one embodiment of the invention, the fabric softening active (hereinafter "FSA") is a quaternary ammonium compound suitable for softening fabric in a rinse step. In one embodiment, the FSA is formed from a reaction product of a fatty acid and an aminoalcohol obtaining mixtures of mono-, di-, and, in one embodiment, triester compounds. In another embodiment, the FSA comprises one or more softener quaternary ammonium compounds such, but not limited to, as a monoalkyquaternary ammonium compound, a diamido quaternary compound and a diester quaternary ammonium compound, or a combination thereof.

In one aspect of the invention, the FSA comprises a diester quaternary ammonium (hereinafter "DQA") compound composition. In certain embodiments of the present invention, the DQA compounds compositions also encompasses a description of diamido FSAs and FSAs with mixed amido and ester linkages as well as the aforementioned diester linkages, all herein referred to as DQA.

A first type of DQA ("DQA (1)") suitable as a FSA in the present CFSC includes a compound comprising the formula:

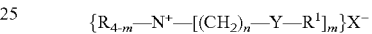

$\{R_{4-m}-N^+-[(CH_2)_n-Y-R^1]_m\}X^-$ wherein each R substituent is either hydrogen, a short chain $C_1$-$C_6$, preferably $C_1$-$C_3$ alkyl or hydroxyalkyl group, e.g., methyl (most preferred), ethyl, propyl, hydroxyethyl, and the like, poly ($C_2$-$C_3$ alkoxy), preferably polyethoxy, group, benzyl, or mixtures thereof; each m is 2 or 3; each n is from 1 to about 4, preferably 2; each Y is —O—(O)C—, —C(O)—O—, —NR—C(O)—, or —C(O)—NR— and it is acceptable for each Y to be the same or different; the sum of carbons in each $R^1$, plus one when Y is —O—(O)C— or —NR—C(O)—, is $C_{12}$-$C_{22}$, preferably $C_{14}$-$C_{20}$, with each $R^1$ being a hydrocarbyl, or substituted hydrocarbyl group; it is acceptable for $R^1$ to be unsaturated or saturated and branched or linear and preferably it is linear; it is acceptable for each $R^1$ to be the same or different and preferably these are the same; and $X^-$ can be any softener-compatible anion, preferably, chloride, bromide, methylsulfate, ethylsulfate, sulfate, phosphate, and nitrate, more preferably chloride or methyl sulfate. Preferred DQA compounds are typically made by reacting alkanolamines such as MDEA (methyldiethanolamine) and TEA (triethanolamine) with fatty acids. Some materials that typically result from such reactions include N,N-di(acyl-oxyethyl)-N,N-dimethylammonium chloride or N,N-di(acyl-oxyethyl)-N,N-methylhydroxyethylammonium methylsulfate wherein the acyl group is derived from animal fats, unsaturated, and polyunsaturated, fatty acids, e.g., tallow, hardended tallow, oleic acid, and/or partially hydrogenated fatty acids, derived from vegetable oils and/or partially hydrogenated vegetable oils, such as, canola oil, safflower oil, peanut oil, sunflower oil, corn oil, soybean oil, tall oil, rice bran oil, palm oil, etc.

Non-limiting examples of suitable fatty acids are listed in U.S. Pat. No. 5,759,990 at column 4, lines 45-66. In one embodiment, the FSA comprises other actives in addition to DQA (1) or DQA. In yet another embodiment, the FSA comprises only DQA (1) or DQA and is free or essentially free of any other quaternary ammonium compounds or other actives. In yet another embodiment, the FSA comprises the precursor amine that is used to produce the DQA.

In another aspect of the invention, the FSA comprises a compound, identified as DTTMAC comprising the formula:

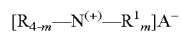

$[R_{4-m}-N^{(+)}-R^1_m]A^-$ wherein each m is 2 or 3, each $R^1$ is a $C_6$-$C_{22}$, preferably $C_{14}$-$C_{20}$, but no more than one being less than about $C_{12}$ and then the other is at least about 16, hydrocarbyl, or substituted hydrocarbyl substituent, preferably $C_{10}$-$C_{20}$ alkyl or alkenyl (unsaturated alkyl, including polyunsaturated alkyl, also referred to sometimes as "alkylene"), most preferably $C_{12}$-$C_{18}$ alkyl or alkenyl, and branch or unbranched. In one embodiment, the Iodine Value (IV) of the FSA is from about 1 to 70; each R is H or a short chain $C_1$-$C_8$, preferably $C_1$-$C_3$ alkyl or hydroxyalkyl group, e.g., methyl (most preferred), ethyl, propyl, hydroxyethyl, and the like, benzyl, or $(R^2O)_{2-4}H$ where each $R^2$ is a $C_1$-$C_6$ alkylene group; and $A^-$ is a softener compatible anion, preferably, chloride, bromide, methylsulfate, ethylsulfate, sulfate, phosphate, or nitrate; more preferably chloride or methyl sulfate.

Examples of these FSAs include dialkydimethylammonium salts and dialkylenedimethylammonium salts such as ditallowedimethylammonium and ditallowedimethylammonium methylsulfate. Examples of commercially available dialkylenedimethylammonium salts usable in the present invention are di-hydrogenated tallow dimethyl ammonium chloride and ditallowedimethyl ammonium chloride available from Degussa under the trade names Adogen® 442 and Adogen® 470 respectively. In one embodiment, the FSA comprises other actives in addition to DTTMAC. In yet another embodiment, the FSA comprises only compounds of the DTTMAC and is free or essentially free of any other quaternary ammonium compounds or other actives.

In one embodiment, the FSA comprises an FSA described in U.S. Pat. Pub. No. 2004/0204337 A1, published Oct. 14, 2004 to Corona et al., from paragraphs 30-79. In another embodiment, the FSA is one described in U.S. Pat. Pub. No. 2004/0229769 A1, published Nov. 18, 2005, to Smith et al., on paragraphs 26-31; or U.S. Pat. No. 6,494,920, at column 1, line 51 et seq. detailing an "esterquat" or a quaternized fatty acid triethanolamine ester salt.

In one embodiment, the FSA is chosen from at least one of the following: ditallowoyloxyethyl dimethyl ammonium chloride, dihydrogenated-tallowoyloxyethyl dimethyl ammonium chloride, ditallow dimethyl ammonium chloride, ditallowoyloxyethyl dimethyl ammonium methyl sulfate, dihydrogenated-tallowoyloxyethyl dimethyl ammonium chloride, dihydrogenated-tallowoyloxyethyl dimethyl ammonium chloride, or combinations thereof.

In one embodiment, the FSA may also include amide containing compound compositions. Examples of diamide comprising compounds may include but not limited to methyl-bis(tallowamidoethyl)-2-hydroxyethylammonium methyl sulfate (available from Degussa under the trade names Varisoft 110 and Varisoft 222). An example of an amide-ester containing compound is N-[3-(stearoylamino)propyl]-N-[2-(stearoyloxy)ethoxy)ethyl)]-N-methylamine.

Another specific embodiment of the invention provides for a rinse added fabric softening composition further comprising a cationic starch. Cationic starches are disclosed in US 2004/0204337 A1. In one embodiment, the rinse added fabric softening composition comprises from about 0.1% to about 7% of cationic starch by weight of the fabric softening composition. In one embodiment, the cationic starch is HCP401 from National Starch.

Suitable Laundry Care Ingredients

While not essential for the purposes of the present invention, the non-limiting list of laundry care ingredients illustrated hereinafter are suitable for use in the laundry care compositions and may be desirably incorporated in certain embodiments of the invention, for example to assist or enhance performance, for treatment of the substrate to be cleaned, or to modify the aesthetics of the composition as is the case with perfumes, colorants, dyes or the like. It is understood that such ingredients are in addition to the components that were previously listed for any particular embodiment. The total amount of such adjuncts may range from about 0.1% to about 50%, or even from about 1% to about 30%, by weight of the laundry care composition.

The precise nature of these additional components, and levels of incorporation thereof, will depend on the physical form of the composition and the nature of the operation for which it is to be used. Suitable laundry care ingredients include, but are not limited to, polymers, for example cationic polymers, surfactants, builders, chelating agents, dye transfer inhibiting agents, dispersants, enzymes, and enzyme stabilizers, catalytic materials, bleach activators, polymeric dispersing agents, clay soil removal/anti-redeposition agents, brighteners, suds suppressors, dyes, additional perfume and perfume delivery systems, structure elasticizing agents, fabric softeners, carriers, hydrotropes, processing aids and/or pigments. In addition to the disclosure below, suitable examples of such other adjuncts and levels of use are found in U.S. Pat. Nos. 5,576,282, 6,306,812 B1 and 6,326,348 B1 that are incorporated by reference.

As stated, the laundry care ingredients are not essential to Applicants' laundry care compositions. Thus, certain embodiments of Applicants' compositions do not contain one or more of the following adjuncts materials: bleach activators, surfactants, builders, chelating agents, dye transfer inhibiting agents, dispersants, enzymes, and enzyme stabilizers, catalytic metal complexes, polymeric dispersing agents, clay and soil removal/anti-redeposition agents, brighteners, suds suppressors, dyes, additional perfumes and perfume delivery systems, structure elasticizing agents, fabric softeners, carriers, hydrotropes, processing aids and/or pigments. However, when one or more adjuncts are present, such one or more adjuncts may be present as detailed below:

Surfactants—

The compositions according to the present invention can comprise a surfactant or surfactant system wherein the surfactant can be selected from nonionic and/or anionic and/or cationic surfactants and/or ampholytic and/or zwitterionic and/or semi-polar nonionic surfactants. The surfactant is typically present at a level of from about 0.1%, from about 1%, or even from about 5% by weight of the cleaning compositions to about 99.9%, to about 80%, to about 35%, or even to about 30% by weight of the cleaning compositions.

Builders—

The compositions of the present invention can comprise one or more detergent builders or builder systems. When present, the compositions will typically comprise at least about 1% builder, or from about 5% or 10% to about 80%, 50%, or even 30% by weight, of said builder. Builders include, but are not limited to, the alkali metal, ammonium and alkanolammonium salts of polyphosphates, alkali metal silicates, alkaline earth and alkali metal carbonates, aluminosilicate builders polycarboxylate compounds. ether hydroxypolycarboxylates, copolymers of maleic anhydride with ethylene or vinyl methyl ether, 1,3,5-trihydroxybenzene-2,4,6-trisulphonic acid, and carboxymethyl-oxysuccinic acid, the various alkali metal, ammonium and substituted ammonium salts of polyacetic acids such as ethylenediamine tetraacetic acid and nitrilotriacetic acid, as well as polycarboxylates such as mellitic acid, succinic acid, oxydisuccinic acid, polymaleic acid, benzene 1,3,5-tricarboxylic acid, carboxymethyloxysuccinic acid, and soluble salts thereof.

Chelating Agents—

The compositions herein may also optionally contain one or more copper, iron and/or manganese chelating agents. If utilized, chelating agents will generally comprise from about 0.1% by weight of the compositions herein to about 15%, or even from about 3.0% to about 15% by weight of the compositions herein.

Dye Transfer Inhibiting Agents—

The compositions of the present invention may also include one or more dye transfer inhibiting agents. Suitable polymeric dye transfer inhibiting agents include, but are not limited to, polyvinylpyrrolidone polymers, polyamine N-oxide polymers, copolymers of N-vinylpyrrolidone and N-vinylimidazole, polyvinyloxazolidones and polyvinylimidazoles or mixtures thereof. When present in the compositions herein, the dye transfer inhibiting agents are present at levels from about 0.0001%, from about 0.01%, from about 0.05% by weight of the cleaning compositions to about 10%, about 2%, or even about 1% by weight of the cleaning compositions.

Dispersants—

The compositions of the present invention can also contain dispersants. Suitable water-soluble organic materials are the homo- or co-polymeric acids or their salts, in which the polycarboxylic acid may comprise at least two carboxyl radicals separated from each other by not more than two carbon atoms.

Enzymes—

The compositions can comprise one or more detergent enzymes which provide cleaning performance and/or fabric care benefits. Examples of suitable enzymes include, but are not limited to, hemicellulases, peroxidases, proteases, cellulases, xylanases, lipases, phospholipases, esterases, cutinases, pectinases, keratanases, reductases, oxidases, phenoloxidases, lipoxygenases, ligninases, pullulanases, tannases, pentosanases, malanases, β-glucanases, arabinosidases, hyaluronidase, chondroitinase, laccase, and amylases, or mixtures thereof. A typical combination is a cocktail of conventional applicable enzymes like protease, lipase, cutinase and/or cellulase in conjunction with amylase.

Enzyme Stabilizers—

Enzymes for use in compositions, for example, detergents can be stabilized by various techniques. The enzymes employed herein can be stabilized by the presence of water-soluble sources of calcium and/or magnesium ions in the finished compositions that provide such ions to the enzymes.

Catalytic Metal Complexes—

Applicants' compositions may include catalytic metal complexes. One type of metal-containing bleach catalyst is a catalyst system comprising a transition metal cation of defined bleach catalytic activity, such as copper, iron, titanium, ruthenium, tungsten, molybdenum, or manganese cations, an auxiliary metal cation having little or no bleach catalytic activity, such as zinc or aluminum cations, and a sequestrate having defined stability constants for the catalytic and auxiliary metal cations, particularly ethylenediaminetetraacetic acid, ethylenediaminetetra (methyl-enephosphonic acid) and water-soluble salts thereof. Such catalysts are disclosed in U.S. Pat. No. 4,430,243.

If desired, the compositions herein can be catalyzed by means of a manganese compound. Such compounds and levels of use are well known in the art and include, for example, the manganese-based catalysts disclosed in U.S. Pat. No. 5,576,282.

Cobalt bleach catalysts useful herein are known, and are described, for example, in U.S. Pat. Nos. 5,597,936 and 5,595,967. Such cobalt catalysts are readily prepared by known procedures, such as taught for example in U.S. Pat. Nos. 5,597,936, and 5,595,967.

Compositions herein may also suitably include a transition metal complex of a macropolycyclic rigid ligand—abbreviated as "MRL". As a practical matter, and not by way of limitation, the compositions and cleaning processes herein can be adjusted to provide on the order of at least one part per hundred million of the benefit agent MRL species in the aqueous washing medium, and may provide from about 0.005 ppm to about 25 ppm, from about 0.05 ppm to about 10 ppm, or even from about 0.1 ppm to about 5 ppm, of the MRL in the wash liquor.

Preferred transition-metals in the instant transition-metal bleach catalyst include manganese, iron and chromium. Preferred MRL's herein are a special type of ultra-rigid ligand that is cross-bridged such as 5,12-diethyl-1,5,8,12-tetraazabicyclo[6.6.2]hexa-decane.

Suitable transition metal MRLs are readily prepared by known procedures, such as taught for example in WO 00/32601, and U.S. Pat. No. 6,225,464.

The following examples further illustrate the subject matter described above but, of course, should not be construed as in any way limiting the scope thereof.

EXAMPLE 1

This example sets forth the structure of several compounds according to the invention. The compounds can be synthesized by the methods described above in the description.

TABLE 1

Structures of several compounds according to the invention (Samples 1-32).

| Sample | Structure |
|---|---|
| Sample 1 |  |

TABLE 1-continued
Structures of several compounds according to the invention (Samples 1-32).
| Sample | Structure |
|---|---|
| Sample 2 | 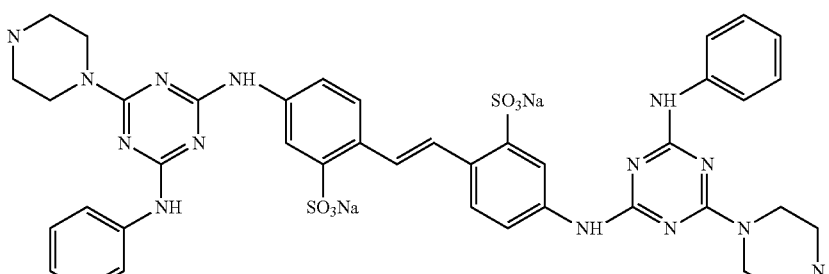 |
| Sample 3 | 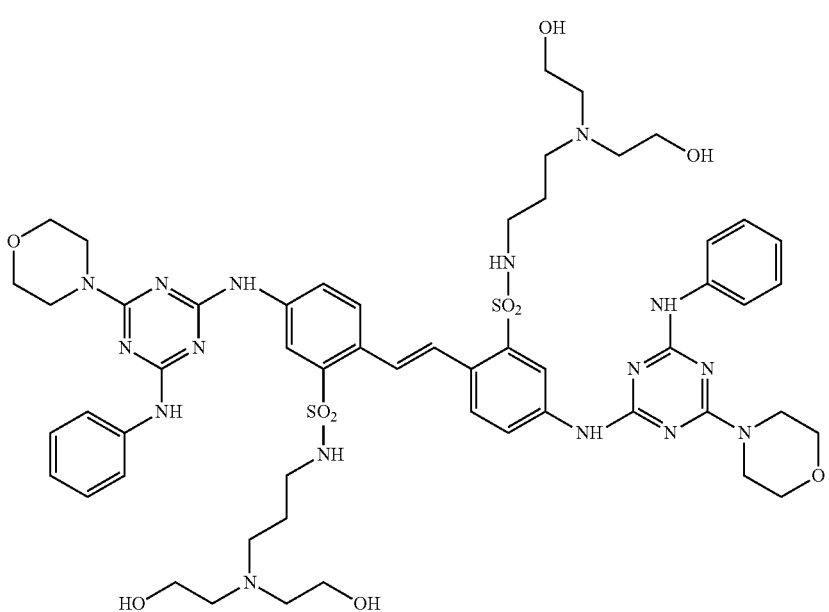 [SMILES: O=S(=O)(NCCCN(CCO)CCO)c1cc(Nc2nc(Nc3ccccc3)nc(N3CCOCC3)n2)ccc1/C=C/c1ccc(Nc2nc(Nc3ccccc3)nc(N3CCOCC3)n2)cc1S(=O)(=O)NCCCN(CCO)CCO] |
| Sample 4 | 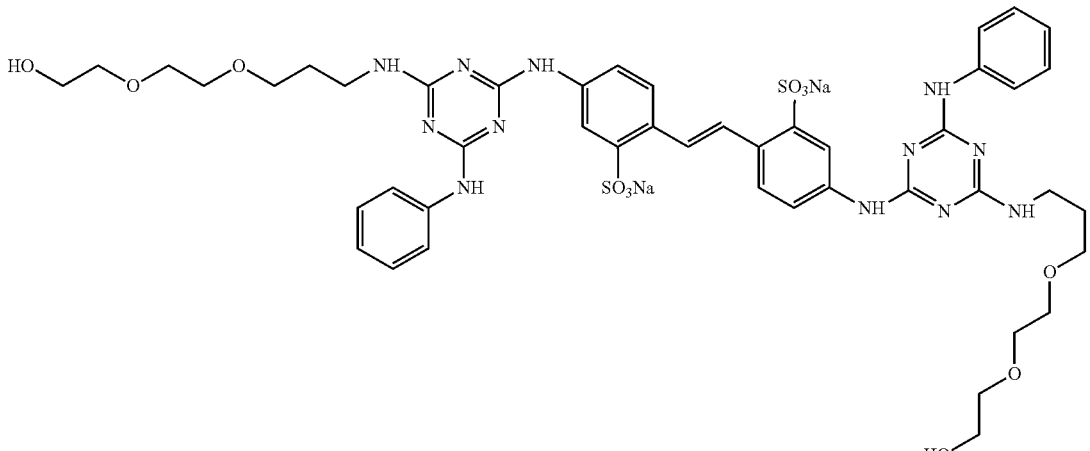 |

TABLE 1-continued

Structures of several compounds according to the invention (Samples 1-32).

| Sample | Structure |
| --- | --- |
| Sample 5 | (chemical structure) |
| Sample 6 | (chemical structure) |
| Sample 7 | (chemical structure) |
| Sample 8 | (chemical structure), where $R = HN{-}(\text{-}CH(CH_3)CH_2O\text{-})_3(\text{-}CH_2CH_2O\text{-})_{19}CH_3$ |

TABLE 1-continued
Structures of several compounds according to the invention (Samples 1-32).
| Sample | Structure |
|---|---|
| Sample 9 | 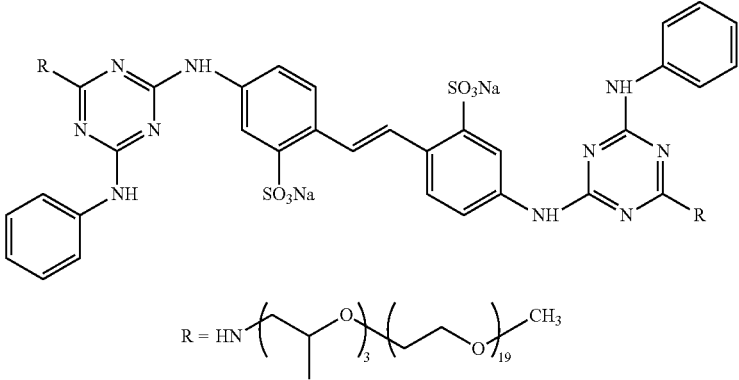 |
| Sample 10 | 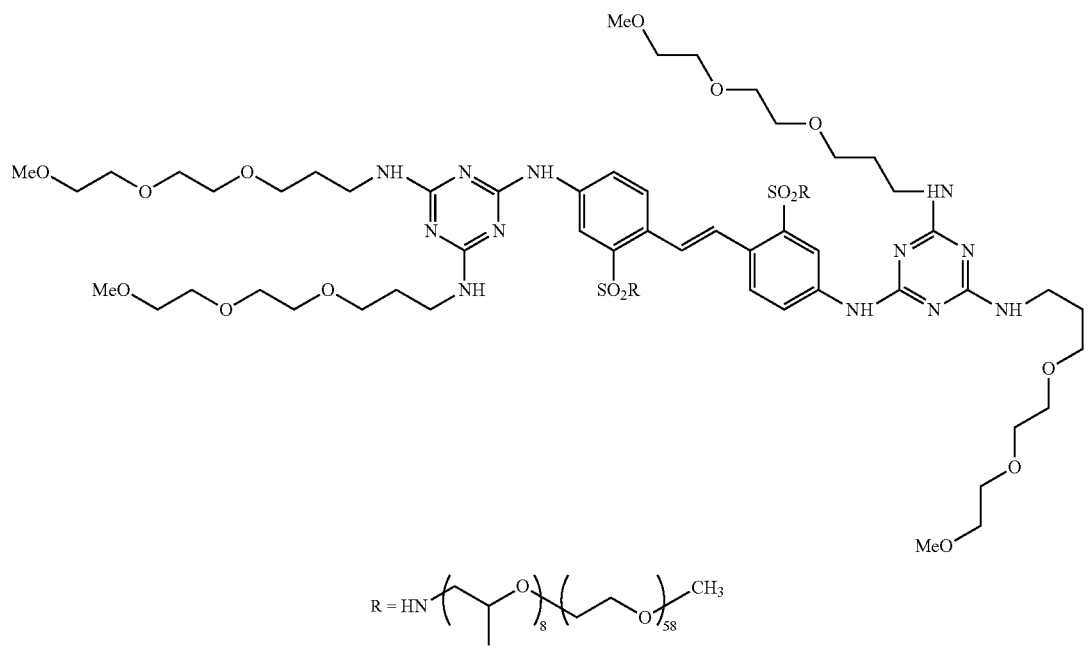 |

TABLE 1-continued

Structures of several compounds according to the invention (Samples 1-32).

| Sample | Structure |
|---|---|
| Sample 11 | (structure image) |
| Sample 12 | (structure image) |
| Sample 13 | (structure image) |

TABLE 1-continued

Structures of several compounds according to the invention (Samples 1-32).

| Sample | Structure |
|---|---|
| Sample 14 | *(chemical structure)* |
| Sample 15 | *(chemical structure)* |
| Sample 16 | *(chemical structure)* $R = HN{-}(CH{-}CH_2{-}O)_3{-}(CH_2CH_2O)_{19}{-}CH_3$ |
| Sample 17 | *(chemical structure)* |

TABLE 1-continued
Structures of several compounds according to the invention (Samples 1-32).
| Sample | Structure |
|---|---|
| Sample 18 | 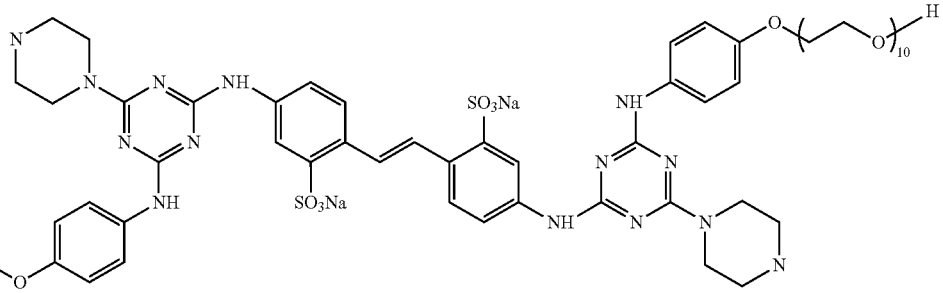 |
| Sample 19 | 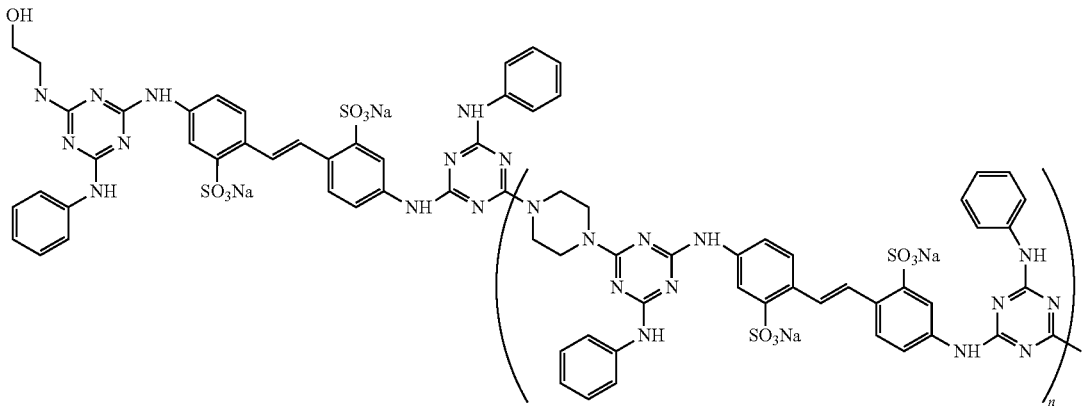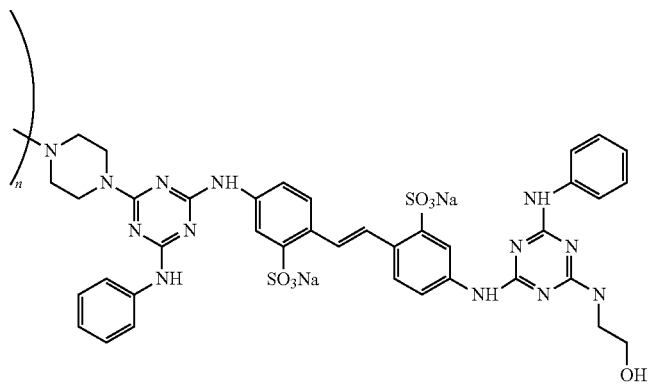 |

| Sample | Structure |
|---|---|
| Sample 20 | 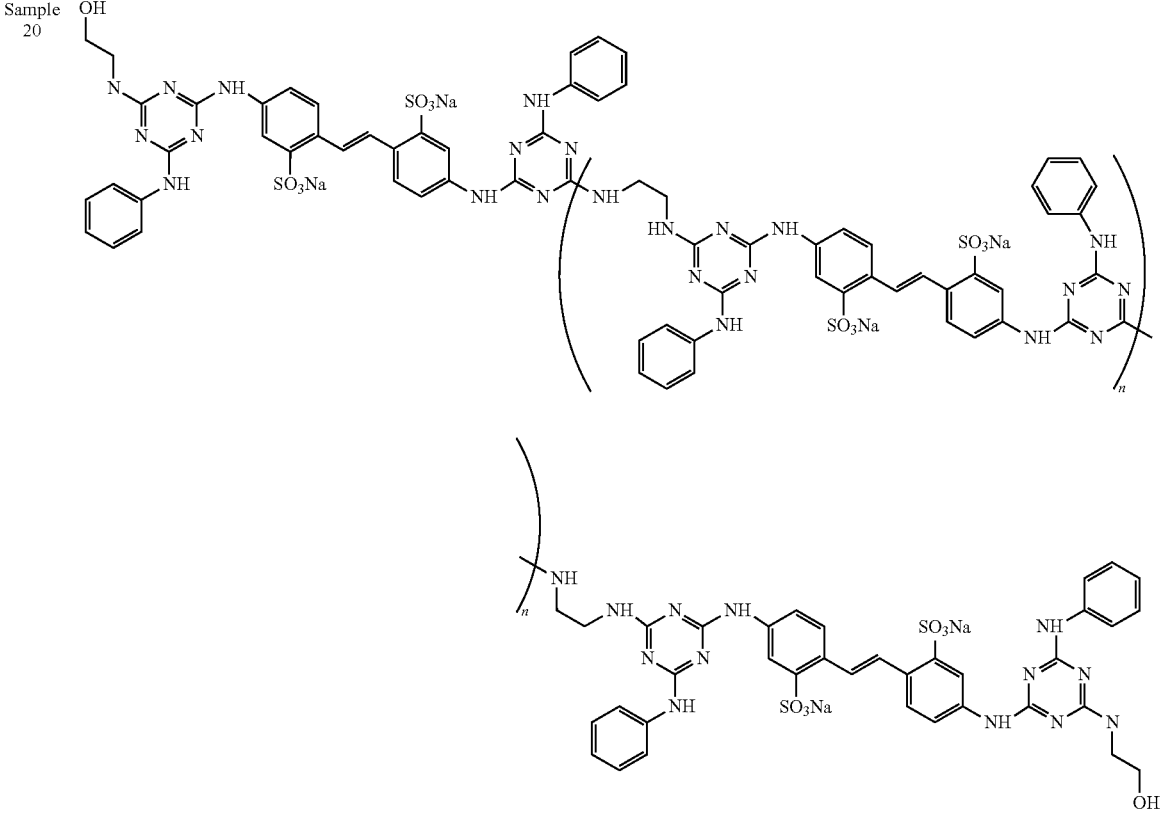 |
| Sample 21 | 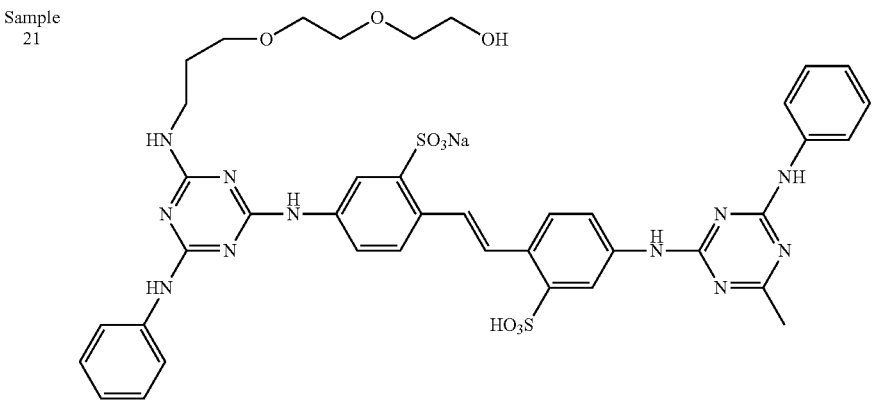 |

TABLE 1-continued
Structures of several compounds according to the invention (Samples 1-32).
| Sample | Structure |
|---|---|
| | 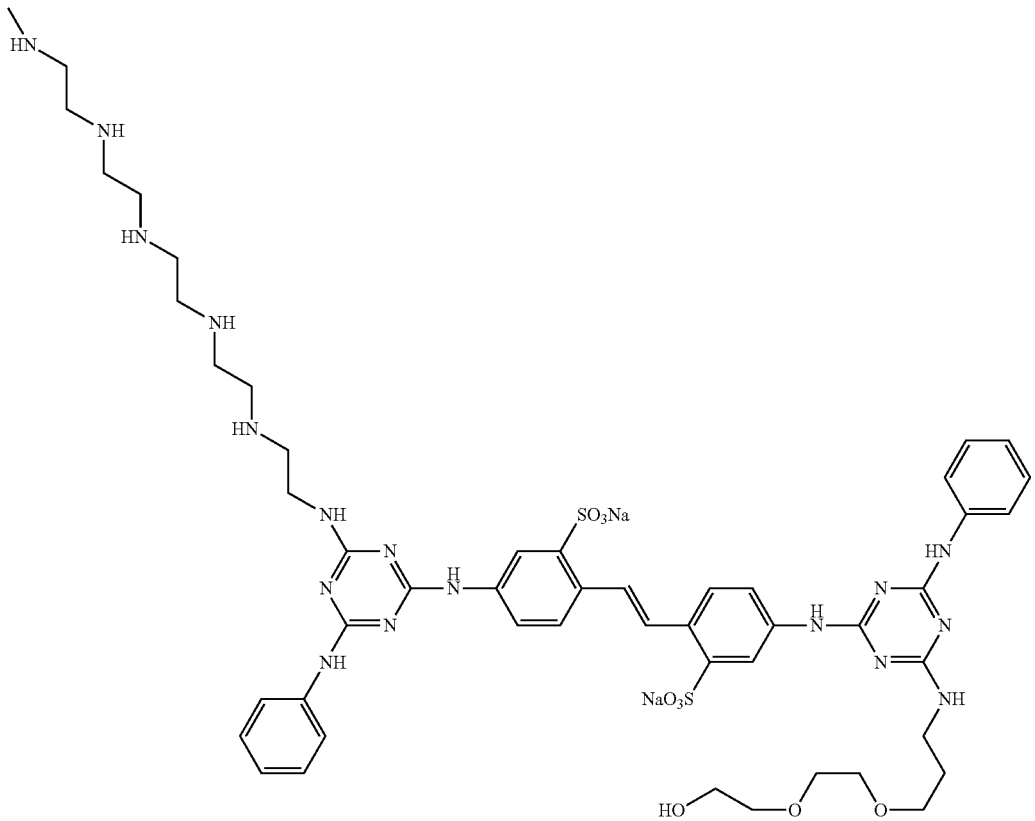 |
| Sample 22 | 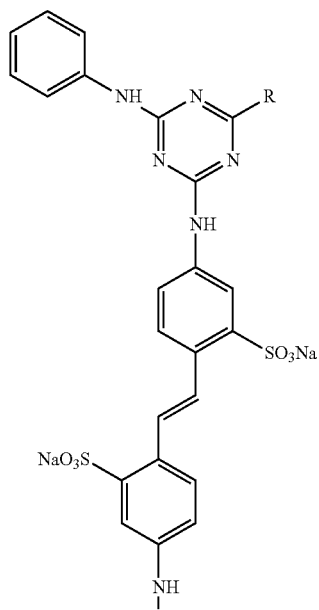 |

TABLE 1-continued

Structures of several compounds according to the invention (Samples 1-32).

| Sample | Structure |
|---|---|

TABLE 1-continued

Structures of several compounds according to the invention (Samples 1-32).

| Sample | Structure |
|---|---|
| Sample 23 | *(chemical structure)* |
| Sample 24 | *(chemical structure)* |
| Sample 25 | *(chemical structure)* |

TABLE 1-continued
Structures of several compounds according to the invention (Samples 1-32).
| Sample | Structure |
|---|---|
| Sample 26 | 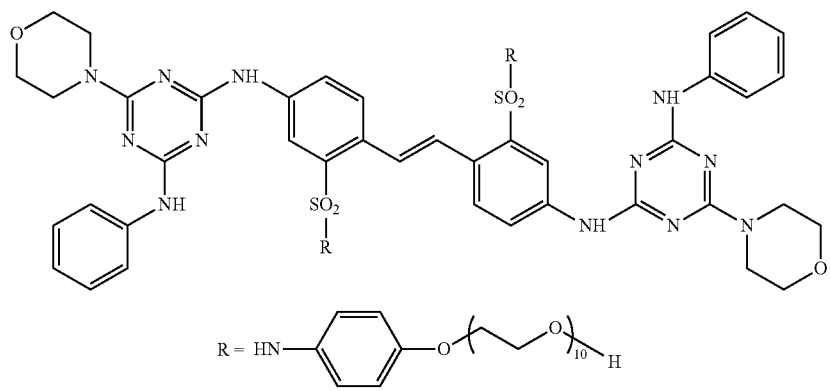 |
| Sample 27 | 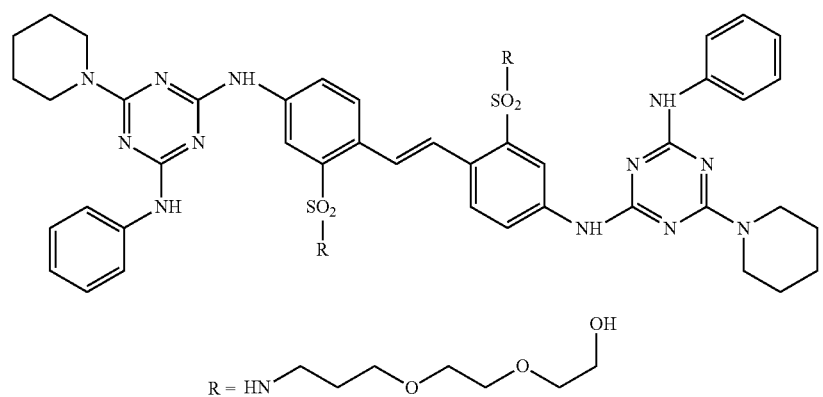 |
| Sample 28 | 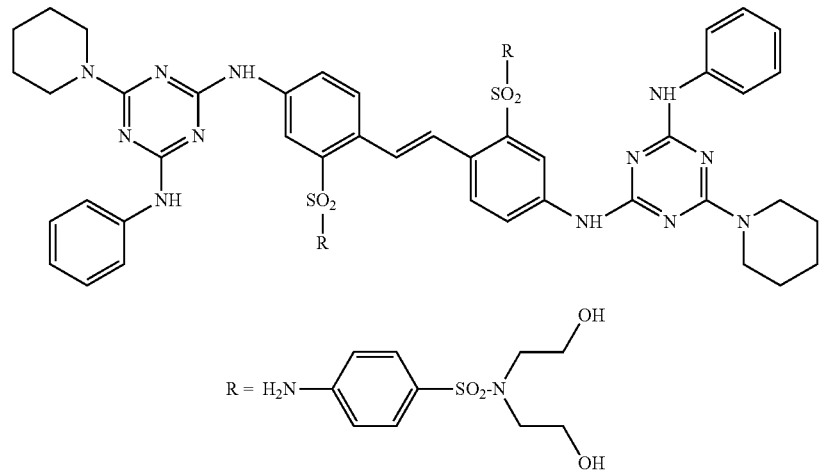 |

TABLE 1-continued

Structures of several compounds according to the invention (Samples 1-32).

| Sample | Structure |
|---|---|
| Sample 29 | |
| Sample 30 | |
| Sample 31 | |
| Sample 32 | |
| Comparative Sample 1 | |

Comparative Sample 1 is a commercially available optical brightener. Several of the compounds set forth in Table 1 were subjected to tests to assess their ability to improve the CIE Whiteness of fabrics and to deposit on fabrics. These tests are set forth below.

EXAMPLE 2

This example demonstrates the change in whiteness index that can be achieved by treating fabrics (e.g., cotton fabrics) with a compound according to the invention.

Samples of 100% Cotton Style 437W (Bleached) Fabrics (Lot 5063) were pretreated with AATCC standard heavy duty liquid (HDL) laundry detergent which was free of optical brighteners. The samples were pretreated by washing with the HDL three times in a standard wash and dry procedure.

Next, a one liter wash bath was prepared containing 2.5% of the AATCC standard HDL laundry detergent, which was free of optical brighteners, and added to a tergotometer. The desired amount of optical brightener, provided in the form of a 0.1% solution of optical brightener in an appropriate solvent (e.g., methanol or DMSO), was then added to the wash water. Samples of the pretreated cotton fabric described above were then added to the tergotometer in an amount sufficient to yield a liquor ratio of about 25 (e.g., about 40 g of fabric were added for each liter of wash water). The fabric samples, which were immersed in the wash water containing the HDL and the optical brightener, were then subjected one simulation wash cycle on the tergotometer. The fabric samples were stirred at approximately 50 rpm for approximately 10 minutes at a temperature of approximately 25° C.

The washed fabric samples were then removed from the tergotometer and allowed to air-dry while protected from light and contamination. Once the fabric samples were dried, the CIE Whiteness of the fabric samples was measured using a Coloreye 7000A. The CIE Whiteness values measured for the compounds according to the invention are set forth in Table 2 below. The table sets forth CIE Whiteness values for each compound at different concentrations of the compound in the wash water.

TABLE 2

CIE Whiteness values for cotton fabrics treated with compounds according to the invention.

| Sample | CIE Whiteness Value | | | |
|---|---|---|---|---|
| | 1 ppm | 2 ppm | 5 ppm | 25 ppm |
| Sample 1 | 96.996 | 107.924 | 117.134 | 137.284 |
| Sample 2 | 95.986 | 105.072 | 117.016 | 126.454 |
| Sample 4 | 90.486 | 95.666 | 103.712 | 120.278 |
| Sample 6 | 88.186 | 91.048 | 97.166 | 112.200 |
| Sample 5 | 86.280 | 89.666 | 94.684 | 111.248 |
| Sample 3 | 85.778 | 88.744 | 94.258 | 109.044 |
| Sample 7 | 84.172 | 85.350 | 89.034 | 98.194 |
| Sample 15 | 83.928 | 84.704 | 87.424 | 97.484 |
| Sample 13 | 82.912 | 83.696 | 86.748 | 94.146 |
| Sample 9 | 82.854 | 83.644 | 85.396 | 92.336 |
| Sample 12 | 83.584 | 84.152 | 86.132 | 92.770 |
| Sample 11 | 82.724 | 83.618 | 85.010 | 90.618 |
| Sample 14 | 82.860 | 83.572 | 85.072 | 90.522 |
| Sample 8 | 82.326 | 83.264 | 84.964 | 89.536 |
| Sample 16 | 82.978 | 82.404 | 82.990 | 84.298 |

The CIE Whiteness value of the control fabric (i.e., fabric that was not treated with an optical brightener) was in the low 80s. Accordingly, the results set forth in Table 2 show that compounds according to the invention can improve the CIE Whiteness of cotton fabrics, especially at higher concentrations.

EXAMPLE 3

This example demonstrates the ability of certain compounds according to the invention to deposit onto polyester-based fabrics.

Polyester-based fabrics were washed in accordance with the general procedure set forth in Example 2. Prior to adding the fabric to the tergotometer, a sample of the wash water was taken and kept so that the initial concentration of the optical brightener compound in the wash water could be determined. After the fabrics had been washed as described above, another sample of the wash water was taken and kept so that the final concentration of the optical brightener compound in the wash water could be determined. The difference in the concentration before and after washing was used to determine the amount of the optical brightener compound that was deposited onto the polyester fabric. The deposition efficiency, which is reported as the percent of optical brightener compound deposited, is reported in Table 3 below.

TABLE 3

Deposition efficiency of compounds according to the invention and Comparative Sample 1.

| Sample | Deposition Efficiency (% Deposited) | | | |
|---|---|---|---|---|
| | 1 ppm | 2 ppm | 5 ppm | 25 ppm |
| Sample 5 | 18.57 | 22.2 | 22.41 | 19.10 |
| Sample 8 | 17.09 | 22.2 | 24.54 | 19.69 |
| Sample 12 | 13.18 | 10.83 | 13.78 | 15.15 |
| Sample 3 | 12.74 | 9.6 | 8.8 | 7.25 |
| Sample 13 | 7.56 | 0 | 1.53 | 0 |
| Sample 9 | 4.7 | 0 | 0 | 0.83 |
| Sample 7 | 4.16 | 3.05 | 8.52 | 0.07 |
| Sample 11 | 3.03 | 4.6 | 8.62 | 0 |
| Sample 10 | 0.67 | 6.04 | 5.73 | 0 |
| Sample 4 | 0 | 1.67 | 6.51 | 4.40 |
| Sample 14 | 0 | 0 | 0.54 | 0 |
| Sample 15 | 0 | 0 | 1.12 | 0 |
| Comparative Sample 1 | 0 | 2.71 | 0 | 5.4 |

As can be seen from the data in Table 3, the compounds of the invention generally exhibit superior deposition on polyester fabric than the commercially-available optical brightener.

All references, including publications, patent applications, and patents, cited herein are hereby incorporated by reference to the same extent as if each reference were individually and specifically indicated to be incorporated by reference and were set forth in its entirety herein.

The use of the terms "a" and "an" and "the" and similar referents in the context of describing the subject matter of this application (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the subject matter of the application and does not pose a limitation on the scope of the subject matter unless otherwise claimed. No language in the specification should be construed as indicating any non-claimed element as essential to the practice of the subject matter described herein.

Preferred embodiments of the subject matter of this application are described herein, including the best mode known to the inventors for carrying out the claimed subject matter. Variations of those preferred embodiments may become apparent to those of ordinary skill in the art upon reading the foregoing description. The inventors expect skilled artisans to employ such variations as appropriate, and the inventors intend for the subject matter described herein to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the present disclosure unless otherwise indicated herein or otherwise clearly contradicted by context.

What is claimed is:

1. A compound conforming to the structure of Formula (I)

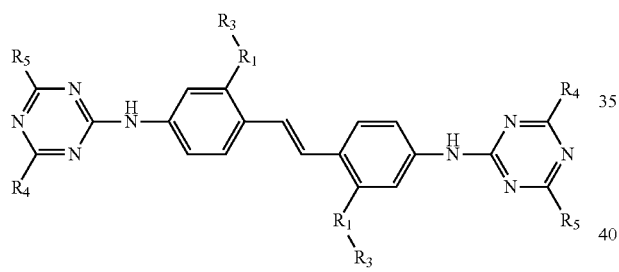

wherein $R_1$ is carbonyl or sulfonyl;
$R_3$ is selected from the group consisting of:
(A) hydroxyl;
(B) —O$^-$M$^+$, wherein M$^+$ is a positively charged counterion;
(J) a substituent selected from the group consisting of —OR$_6$, —NHR$_6$, and —NR$_6$R$_6$; wherein R$_6$ is selected from the group consisting of —R$_7$—O—R$_8$—R$_9$ and —R$_8$—R$_9$; R$_7$ is alkyl or aryl; R$_9$ is hydrogen or alkyl; and R$_8$ is a divalent substituent selected from the group consisting of:
(i) divalent oligomeric substituents comprising two or more divalent repeating units independently selected from repeating units conforming to the structure of Formula (V)

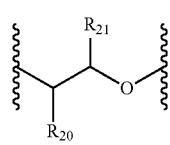

wherein $R_{20}$ and $R_{21}$ are independently selected from the group consisting of hydrogen, alkyl, hydroxyalkyl, aryl, alkoxyalkyl, and aryloxyalkyl;
(ii) divalent substituents conforming to the structure of Formula (VIII)

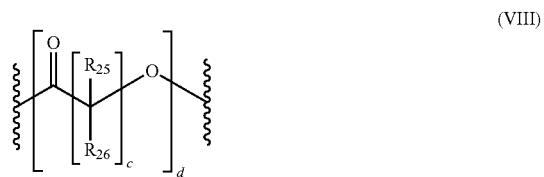

wherein $R_{25}$ and $R_{26}$ are independently selected from the group consisting of hydrogen, hydroxyl, and $C_1$-$C_{10}$ alkyl, c is an integer from 1 to 12, and d is an integer from 1 to 100;
(iii) divalent substituents conforming to the structure of Formula (IX)

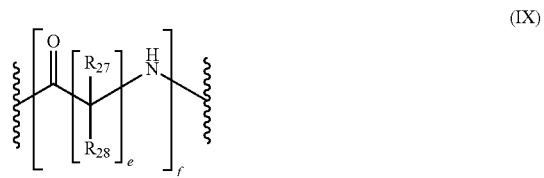

wherein $R_{27}$ and $R_{28}$ are independently selected from the group consisting of hydrogen, hydroxyl, and $C_1$-$C_{10}$ alkyl, e is an integer from 1 to 12, and f is an integer from 1 to 100;
(iv) divalent substituents conforming to the structure of Formula (XI)

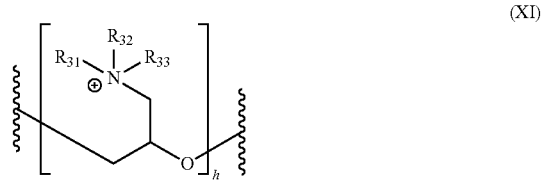

wherein $R_{31}$, $R_{32}$, and $R_{33}$ are independently selected from alkyl and hydroxyalkyl, and h is an integer from 1 to 100; and
(v) divalent substituents comprising two or more substituents selected from the group consisting of (i)-(iv);
$R_4$ and $R_5$ are independently selected from the group consisting of hydrogen, alkoxy, amino, alkylamino, arylamino, hydroxyalkylamino, morpholino, aniline, alkyl anilino, piperazinyl, piperidinyl,
(R) a substituent selected from the group consisting of —OR$_{10}$, —NHR$_{10}$, and —NR$_{10}$R$_{10}$; wherein R$_{10}$ is selected from the group consisting of —R$_{11}$—O—R$_{12}$—R$_{13}$ and —R$_{12}$—R$_{13}$; R$_{11}$ is alkyl or aryl; R$_{13}$ is hydrogen or alkyl; and R$_{12}$ is a divalent substituent selected from the group consisting of:
(i) divalent oligomeric substituents comprising two or more divalent repeating units independently selected from repeating units conforming to the structure of Formula (V)

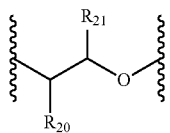

(V)

wherein $R_{20}$ and $R_{21}$ are independently selected from the group consisting of hydrogen, alkyl, hydroxyalkyl, aryl, alkoxyalkyl, and aryloxyalkyl;
(ii) divalent substituents conforming to the structure of Formula (VIII)

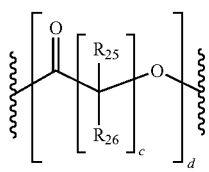

(VIII)

wherein $R_{25}$ and $R_{26}$ are independently selected from the group consisting of hydrogen, hydroxyl, and $C_1$-$C_{10}$ alkyl, c is an integer from 1 to 12, and d is an integer from 1 to 100;
(iii) divalent substituents conforming to the structure of Formula (IX)

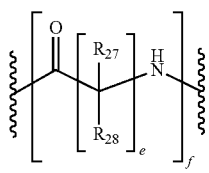

(IX)

wherein $R_{27}$ and $R_{28}$ are independently selected from the group consisting of hydrogen, hydroxyl, and $C_1$-$C_{10}$ alkyl, e is an integer from 1 to 12, and f is an integer from 1 to 100;
(iv) divalent substituents conforming to the structure of Formula (XI)

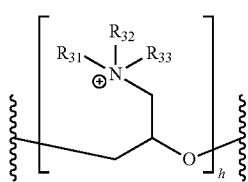

(XI)

wherein $R_{31}$, $R_{32}$, and $R_{33}$ are independently selected from alkyl and hydroxyalkyl, and h is an integer from 1 to 100; and
(v) divalent substituents comprising two or more substituents selected from the group consisting of (i)-(iv);
wherein $R_3$ is not hydroxyl or —$O^-M^+$ when $R_4$ and $R_5$ are both selected from the group consisting of hydrogen, alkoxy, amino, alkylamino, arylamino, hydroxyalkylamino, morpholino, anilino, and alkyl anilino, and wherein at least one of $R_8$ and $R_{12}$ comprises at least one divalent substituent conforming to the structure of Formula (VIII), Formula (IX), or Formula (XI).

2. The compound of claim 1, wherein $R_8$ is a divalent oligomeric substituent comprising two or more monomers selected from the group consisting of ethylene oxide, propylene oxide, and butylene oxide.

3. The compound of claim 2, wherein $R_8$ further comprises a divalent oligomeric substituent conforming to the structure of one of Formulae (XIII)-(XV)

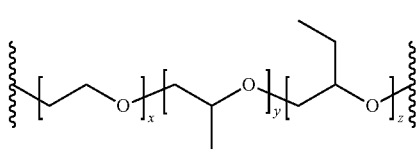

(XIII)

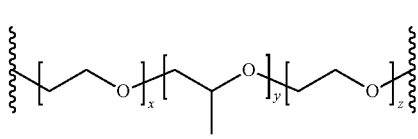

(XIV)

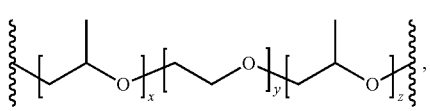

(XV)

x, y, and z are integers from 0 to 100, and the sum of x, y, and z is 2 or greater.

4. The compound of claim 1, wherein $R_1$ is sulfonyl, and $R_3$ is —$NHR_6$.

5. The compound of claim 4, wherein $R_6$ is —$R_7$—O—$R_8$—$R_9$, $R_7$ is $C_1$-$C_{10}$ alkyl, $R_8$ further comprises a divalent oligomeric substituent conforming to the structure of one of Formulae (XIII)-(XV)

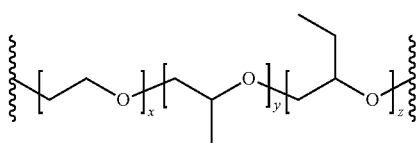

(XIII)

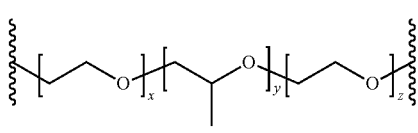

(XIV)

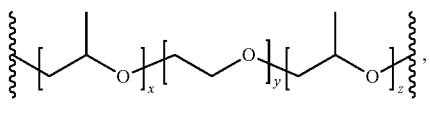

(XV)

x, y, and z are integers from 0 to 100, and the sum of x, y, and z is 2 or greater.

6. The compound of claim 4, wherein $R_6$ is —$R_8$—$R_9$, $R_8$ further comprises a divalent oligomeric substituent conforming to the structure of one of Formulae (XIII)-(XV)

(XIII)
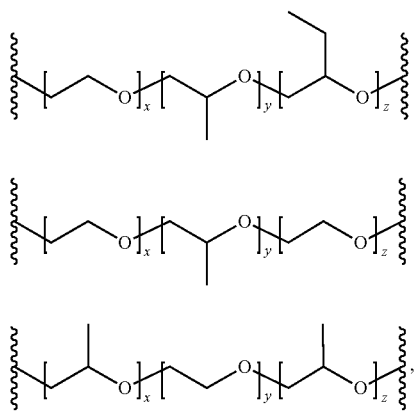

(XIV)

(XV)

x, y, and z are integers from 0 to 100, and the sum of x, y, and z is 2 or greater.

7. The compound of claim 1, wherein $R_4$ is —$OR_{10}$ or —$NHR_{10}$.

8. The compound of claim 7, wherein $R_{12}$ is a divalent oligomeric substituent comprising three or more monomers selected from the group consisting of ethylene oxide, propylene oxide, and butylene oxide.

9. The compound of claim 8, wherein $R_{12}$ further comprises a divalent oligomeric substituent conforming to the structure of one of Formulae (XIII)-(XV)

(XIII)
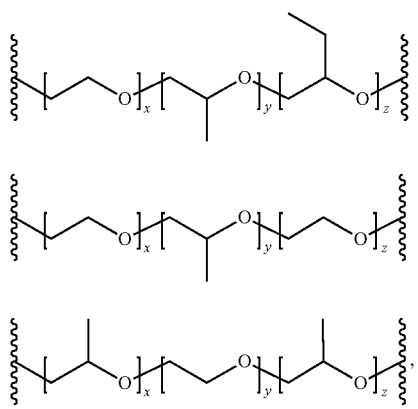

(XIV)

(XV)

x, y, and z are integers from 0 to 100, and the sum of x, y, and z is 2 or greater.

10. The compound of claim 7, wherein $R_4$ is —$NHR_{10}$, $R_{10}$ is —$R_{11}$—O—$R_{12}$—$R_{13}$, $R_{11}$ is $C_1$-$C_{10}$ alkyl, $R_{12}$ further comprises a divalent oligomeric substituent conforming to the structure of one of Formulae (XIII)-(XIV)

(XIII)
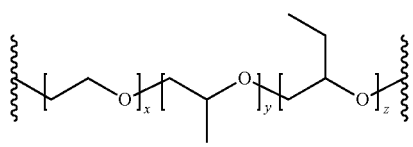

(XIV)
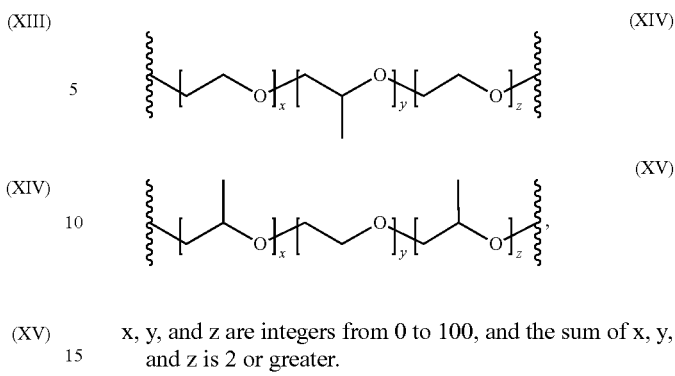

(XV)

x, y, and z are integers from 0 to 100, and the sum of x, y, and z is 2 or greater.

11. The compound of claim 7, wherein $R_4$ is —$NHR_{10}$, $R_{10}$ is —$R_{12}$—$R_{13}$, $R_{12}$ further comprises a divalent oligomeric substituent conforming to the structure of one of Formulae (XIII)-(XV)

(XIII)
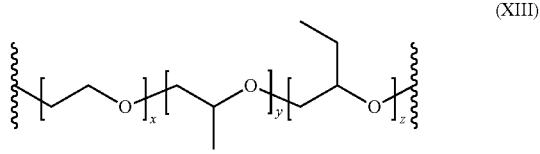

(XIV)
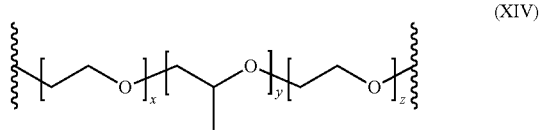

(XV)
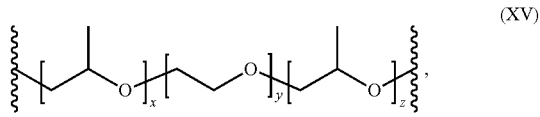

x, y, and z are integers from 0 to 100, and the sum of x, y, and z is 2 or greater.

12. The compound of claim 7, wherein $R_5$ is —$OR_{14}$ or —$NHR_{14}$.

13. The compound of claim 12, wherein $R_{16}$ is a divalent oligomeric substituent comprising three or more monomers selected from the group consisting of ethylene oxide, propylene oxide, and butylene oxide.

14. The compound of claim 12, wherein $R_5$ is —$NHR_{14}$, $R_{14}$ is —$R_{15}$—O—$R_{16}$—$R_{17}$, $R_{15}$ is $C_1$-$C_{10}$ alkyl, $R_{16}$ further comprises a divalent oligomeric substituent conforming to the structure of one of Formulae (XIII)-(XV)

(XIII)
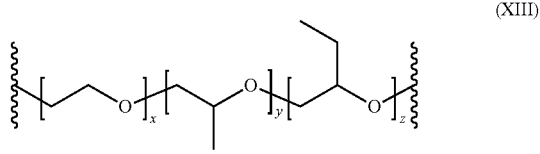

(XIV)
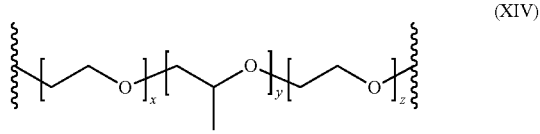

(XV)

[structure XV]

x, y, and z are integers from 0 to 100, and the sum of x, y, and z is 2 or greater.

15. The compound of claim 12, wherein $R_5$ is —$NHR_{14}$, $R_{14}$ is —$R_{16}$—$R_{17}$, $R_{16}$ further comprises a divalent oligomeric substituent conforming to the structure of one of Formulae (XIII)-(XV):

(XIII)

[structure XIII]

(XIV)

[structure XIV]

(XV)

[structure XV]

x, y, and z are integers from 0 to 100, and the sum of x, y, and z is 2 or greater.

16. A compound conforming to the structure of Formula (XX)

(XX)

[structure XX showing benzotriazole groups]

wherein $R_1$ is carbonyl or sulfonyl;

$R_3$ is selected from the group consisting of:
  (A) hydroxyl;
  (B) —$O^-M^+$, wherein $M^+$ is a positively charged counterion;
  (J) a substituent selected from the group consisting of —$OR_6$, —$NHR_6$, and —$NR_6R_6$; wherein $R_6$ is selected from the group consisting of —$R_7$—O—$R_8$—$R_9$ and —$R_8$—$R_9$; $R_7$ is alkyl or aryl; $R_9$ is hydrogen or alkyl; and $R_8$ is a divalent substituent selected from the group consisting of:

(i) divalent oligomeric substituents comprising two or more divalent repeating units independently selected from repeating units conforming to the structure of Formula (V)

(V)

[structure V]

wherein $R_{20}$ and $R_{21}$ are independently selected from the group consisting of hydrogen, alkyl, hydroxyalkyl, aryl, alkoxyalkyl, and aryloxyalkyl;

(ii) divalent substituents conforming to the structure of Formula (VIII)

(VIII)

[structure VIII]

wherein $R_{25}$ and $R_{26}$ are independently selected from the group consisting of hydrogen, hydroxyl, and $C_1$-$C_{10}$ alkyl, c is an integer from 1 to 12, and d is an integer from 1 to 100;

(iii) divalent substituents conforming to the structure of Formula (IX)

(IX)

[structure IX]

wherein $R_{27}$ and $R_{28}$ are independently selected from the group consisting of hydrogen, hydroxyl, and $C_1$-$C_{10}$ alkyl, e is an integer from 1 to 12, and f is an integer from 1 to 100;

(iv) divalent substituents conforming to the structure of Formula (XI)

(XI)

[structure XI]

wherein $R_{31}$, $R_{32}$, and $R_{33}$ are independently selected from alkyl and hydroxyalkyl, and h is an integer from 1 to 100; and (v) divalent substituents comprising two or more substituents selected from the group consisting of (i)-(iv);

$R_{50}$ is —$R_{51}$—$R_{52}$ or —$OR_{10}$, provided $R_{51}$ is independently selected from the substituents recited above for $R_1$, and $R_{52}$ is independently selected from the substituents recited above for $R_3$;

$R_{10}$ is selected from the group consisting of —$R_{11}$—O—$R_{12}$—$R_{13}$ and —$R_{12}$—$R_{13}$; $R_{11}$ is alkyl or aryl; $R_{13}$ is hydrogen or alkyl; and $R_{12}$ is a divalent substituent selected from the group consisting of:

(i) divalent oligomeric substituents comprising two or more divalent repeating units independently selected from repeating units conforming to the structure of Formula (V)

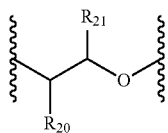

(V)

wherein $R_{20}$ and $R_{21}$ are independently selected from the group consisting of hydrogen, alkyl, hydroxyalkyl, aryl, alkoxyalkyl, and aryloxyalkyl;

(ii) divalent substituents conforming to the structure of Formula (VIII)

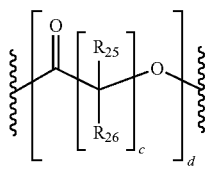

(VIII)

wherein $R_{25}$ and $R_{26}$ are independently selected from the group consisting of hydrogen, hydroxyl, and $C_1$-$C_{10}$ alkyl, c is an integer from 1 to 12, and d is an integer from 1 to 100;

(iii) divalent substituents conforming to the structure of Formula (IX)

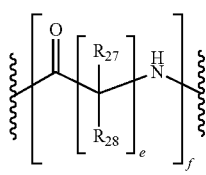

(IX)

wherein $R_{27}$ and $R_{28}$ are independently selected from the group consisting of hydrogen, hydroxyl, and $C_1$-$C_{10}$ alkyl, e is an integer from 1 to 12, and f is an integer from 1 to 100;

(iv) divalent substituents conforming to the structure of Formula (XI)

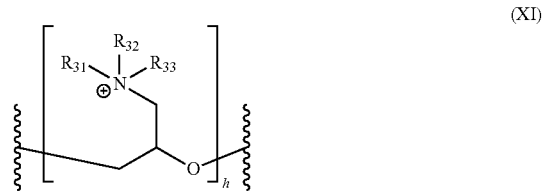

(XI)

wherein $R_{31}$, $R_{32}$, and $R_{33}$ are independently selected from alkyl and hydroxyalkyl, and h is an integer from 1 to 100; and (v) divalent substituents comprising two or more substituents selected from the group consisting of (i)-(iv)

wherein $R_3$ is not hydroxyl or —$O^-M^+$ when $R_{52}$ is either hydroxyl or —$O^-M^+$, and $R_{52}$ is not hydroxyl or —$O^-M^+$ when $R_3$ is either hydroxyl or —$O^-M^+$, and wherein at least one of $R_8$ and $R_{12}$ comprises at least one divalent substituent conforming to the structure of Formula (VIII), Formula (IX) or Formula (XI).

17. The compound of claim 16, wherein $R_8$ is a divalent oligomeric substituent comprising two or more monomers selected from the group consisting of ethylene oxide, propylene oxide, and butylene oxide.

18. The compound of claim 17, wherein $R_8$ further comprises a divalent oligomeric substituent conforming to the structure of one of Formulae (XIII)-(XV)

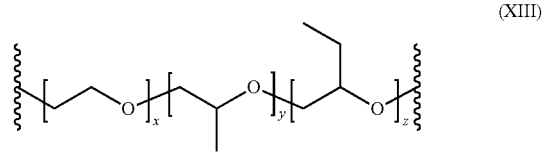

(XIII)

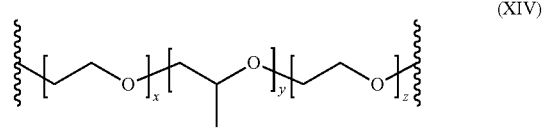

(XIV)

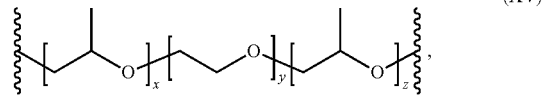

(XV)

x, y, and z are integers from 0 to 100, and the sum of x, y, and z is 2 or greater.

19. The compound of claim 16, wherein $R_1$ is sulfonyl, $R_3$ is hydroxyl or —$O^-M^+$, and $R_{50}$ is —$OR_{10}$.

20. The compound of claim 19, wherein $R_{10}$ is —$R_{12}$—$R_{13}$; $R_{12}$ is a divalent oligomeric substituent comprising two or more monomers selected from the group consisting of ethylene oxide, propylene oxide, and butylene oxide; and $R_{13}$ is hydrogen.

21. A laundry care composition comprising a laundry care ingredient and the compound of claim 1.

22. A laundry care composition comprising a laundry care ingredient and the compound of claim 16.

* * * * *